(12) United States Patent
Bourlas et al.

(10) Patent No.: US 8,468,214 B1
(45) Date of Patent: Jun. 18, 2013

(54) SYSTEMS AND METHODS FOR DISTRIBUTING CONTENT USING ATTRIBUTES

(75) Inventors: Yair Bourlas, San Diego, CA (US);
Jaroslaw Dzierzega, Wodzislaw Slaski (PL); Aleksander Seman, Rybnik (PL); Michael Sanderson, San Diego, CA (US); Tracy Raymond Trent, San Diego, CA (US); Juan York, San Diego, CA (US)

(73) Assignee: Proximetry, Inc., San Diego, CA (US)

( * ) Notice: Subject to any disclaimer, the term of this patent is extended or adjusted under 35 U.S.C. 154(b) by 114 days.

(21) Appl. No.: 12/951,008

(22) Filed: Nov. 20, 2010

Related U.S. Application Data

(60) Provisional application No. 61/354,777, filed on Jun. 15, 2010.

(51) Int. Cl.
*G06F 15/16* (2006.01)
(52) U.S. Cl.
USPC .......................................... 709/217; 709/238
(58) Field of Classification Search
USPC .................................................. 709/238, 217
See application file for complete search history.

(56) References Cited

U.S. PATENT DOCUMENTS

| | | | |
|---|---|---|---|
| 5,524,272 A * | 6/1996 | Podowski et al. ............... | 725/74 |
| 6,765,495 B1 | 7/2004 | Dunning | |
| 6,810,527 B1 | 10/2004 | Conrad et al. | |
| 7,339,937 B2 | 3/2008 | Mitra | |
| 7,518,489 B2 | 4/2009 | Nelson | |
| 7,526,493 B2 | 4/2009 | Betts | |
| 7,548,744 B2 | 6/2009 | Oesterling | |
| 7,593,999 B2 | 9/2009 | Nathanson | |
| 7,599,691 B1 | 10/2009 | Mitchell | |
| 7,696,864 B2 | 4/2010 | Dillon | |
| 2002/0059614 A1 | 5/2002 | Lipsanen | |
| 2002/0138352 A1 | 9/2002 | Demaggio | |
| 2004/0098728 A1 | 5/2004 | Husain | |
| 2005/0055722 A1 | 3/2005 | Lym | |
| 2005/0222933 A1 | 10/2005 | Wesby | |
| 2005/0256616 A1 | 11/2005 | Rhoads | |
| 2007/0115109 A1 | 5/2007 | Turney | |
| 2007/0168550 A1 | 7/2007 | Wang | |
| 2008/0004967 A1 | 1/2008 | Gillen | |
| 2008/0075090 A1 | 3/2008 | Farricker | |
| 2008/0090513 A1 | 4/2008 | Collins et al. | |
| 2008/0224853 A1 | 9/2008 | Patel | |
| 2009/0092074 A1 | 4/2009 | Jamalipour et al. | |
| 2009/0285123 A1 * | 11/2009 | Huang et al. .................. | 370/254 |
| 2010/0057563 A1 | 3/2010 | Rauber et al. | |
| 2010/0094532 A1 | 4/2010 | Vorona | |

(Continued)

OTHER PUBLICATIONS

Carzaniga, Content-based Addressing and Routing: A General Model and its Application, Jan. 2000, 15 pages.

(Continued)

*Primary Examiner* — Hassan Kizou
*Assistant Examiner* — Hashim Bhatti
(74) *Attorney, Agent, or Firm* — Letham Law Firm LLC; Lawrence Letham

(57) ABSTRACT

Methods and apparatus for distributing content between fixed and nomadic servers using attributes. Attributes may relate to, inter alia, the type of content, location of a fixed and/or nomadic content server, a vehicle that includes a nomadic server, an ability to use content, a need for content, vehicle owner information, and/or time.

19 Claims, 9 Drawing Sheets

U.S. PATENT DOCUMENTS

| | | |
|---|---|---|
| 2010/0117865 A1 | 5/2010 | Teffer |
| 2010/0142448 A1 | 6/2010 | Schlicht |
| 2010/0142503 A1 | 6/2010 | Kubler |
| 2010/0191395 A1 | 7/2010 | Rosenkranz |
| 2010/0211582 A1 | 8/2010 | Kotski |
| 2010/0240299 A1 | 9/2010 | Karino |
| 2011/0125663 A1 | 5/2011 | Kraft |
| 2011/0251960 A1 | 10/2011 | Holla et al. |
| 2012/0072364 A1 | 3/2012 | Ho |

OTHER PUBLICATIONS

Carzaniga, A Routing Scheme for Content-Based Networking, Jun. 2003, 18 pages.

* cited by examiner

US 8,468,214 B1

SYSTEMS AND METHODS FOR DISTRIBUTING CONTENT USING ATTRIBUTES

CROSS-REFERENCE TO RELATED APPLICATIONS

This application claims the benefit of U.S. Provisional Patent Application No. 61/354,777 filed Jun. 15, 2010 herein incorporated by reference.

FIELD OF THE INVENTION

Embodiments of the present invention relate to computers, communication equipment, networks, and distributing content (e.g., data, information, electronic files) to content servers (e.g., stationary, mobile, roaming).

BACKGROUND OF THE INVENTION

Many types of vehicles (e.g., plane, car, truck) carry some type of a computer (e.g., processing circuit, server, workstation) that provides content to the occupants of the vehicle. In some cases (e.g., aircraft, trail, bus, maintenance vehicles), continuous communication to provide content to or receive content from the vehicle is not possible; however, content may be provided to the vehicle or received from the vehicle at certain fixed physical locations (e.g., airports, maintenance yards, fueling stations, bus terminals, train stations). Because the physical locations may vary (e.g., different airports, different yards, different fueling stations, different terminals, different stations), content for delivery to the vehicle may need to be distributed to different locations depending on the route or schedule of the vehicle. Further, content may need to be delivered to a location prior to arrival of the vehicle, so that the content may be delivered to the vehicle during the limited time that the vehicle will be at the physical location.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
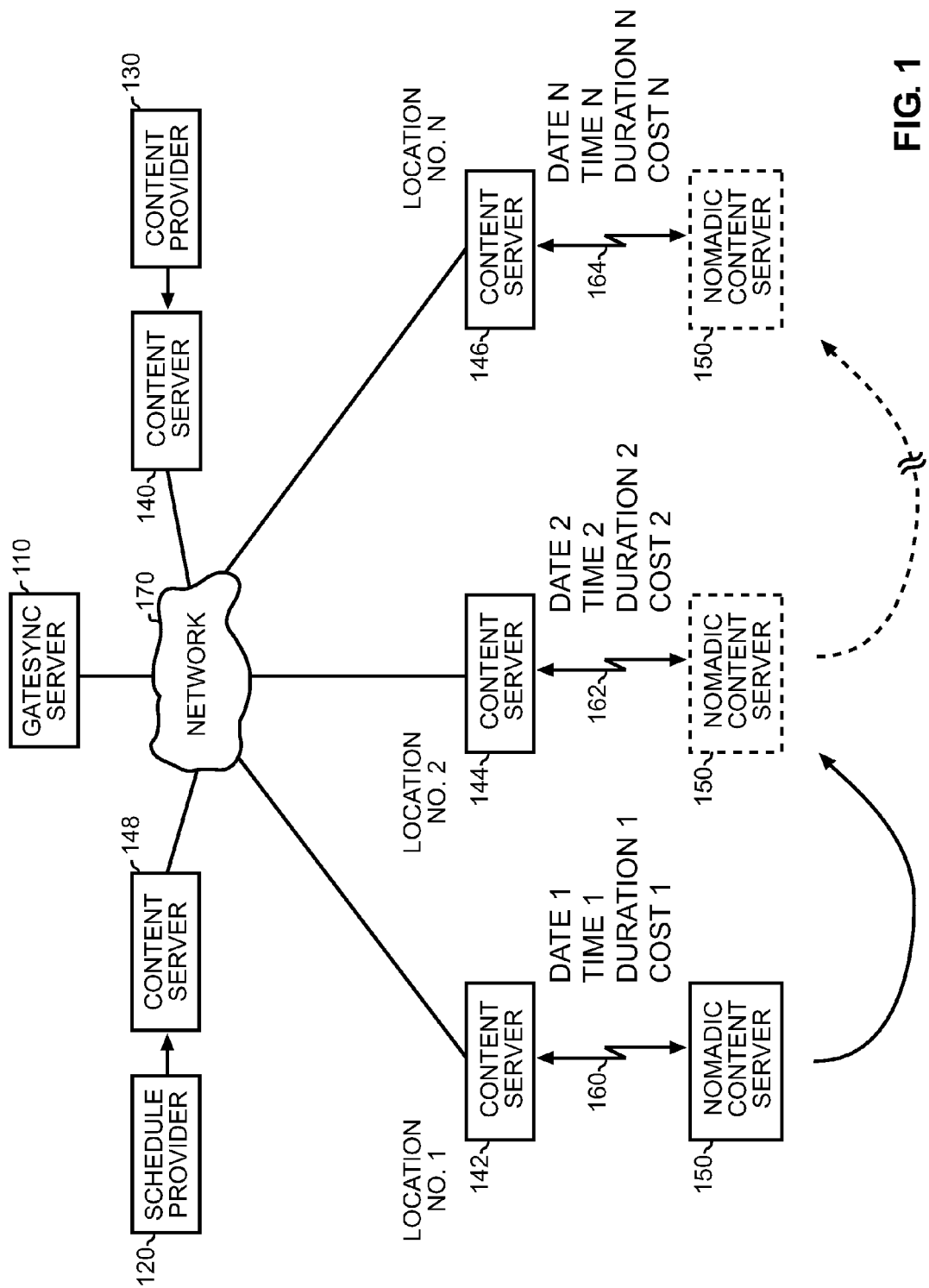
FIG. 1 is a function block diagram of a system for distributing content according to various aspects of the present invention.
Figure 2:
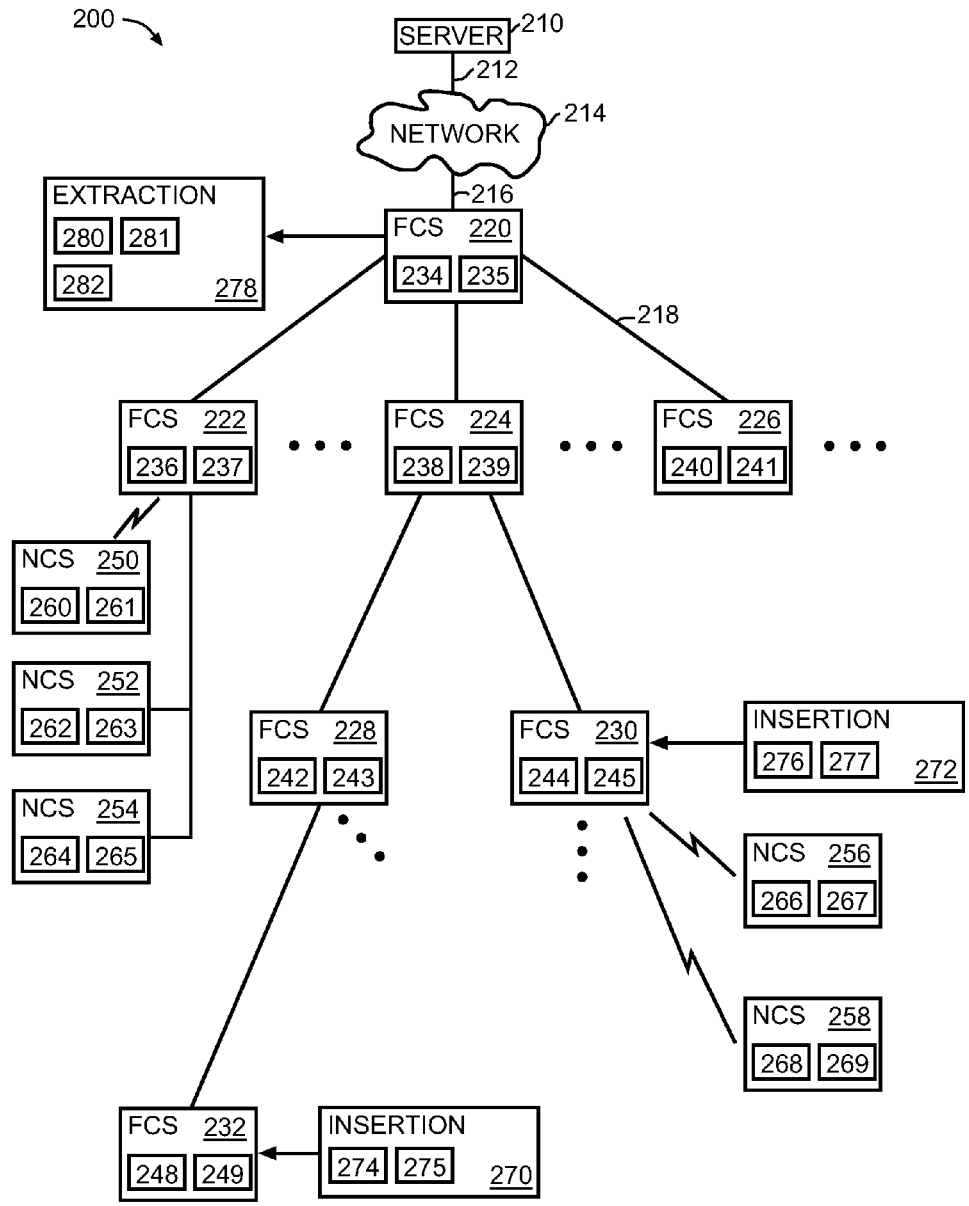
FIG. 2 is a functional block diagram of a hierarchy of servers for distributing content according to various aspects of the present invention.
Figure 3:
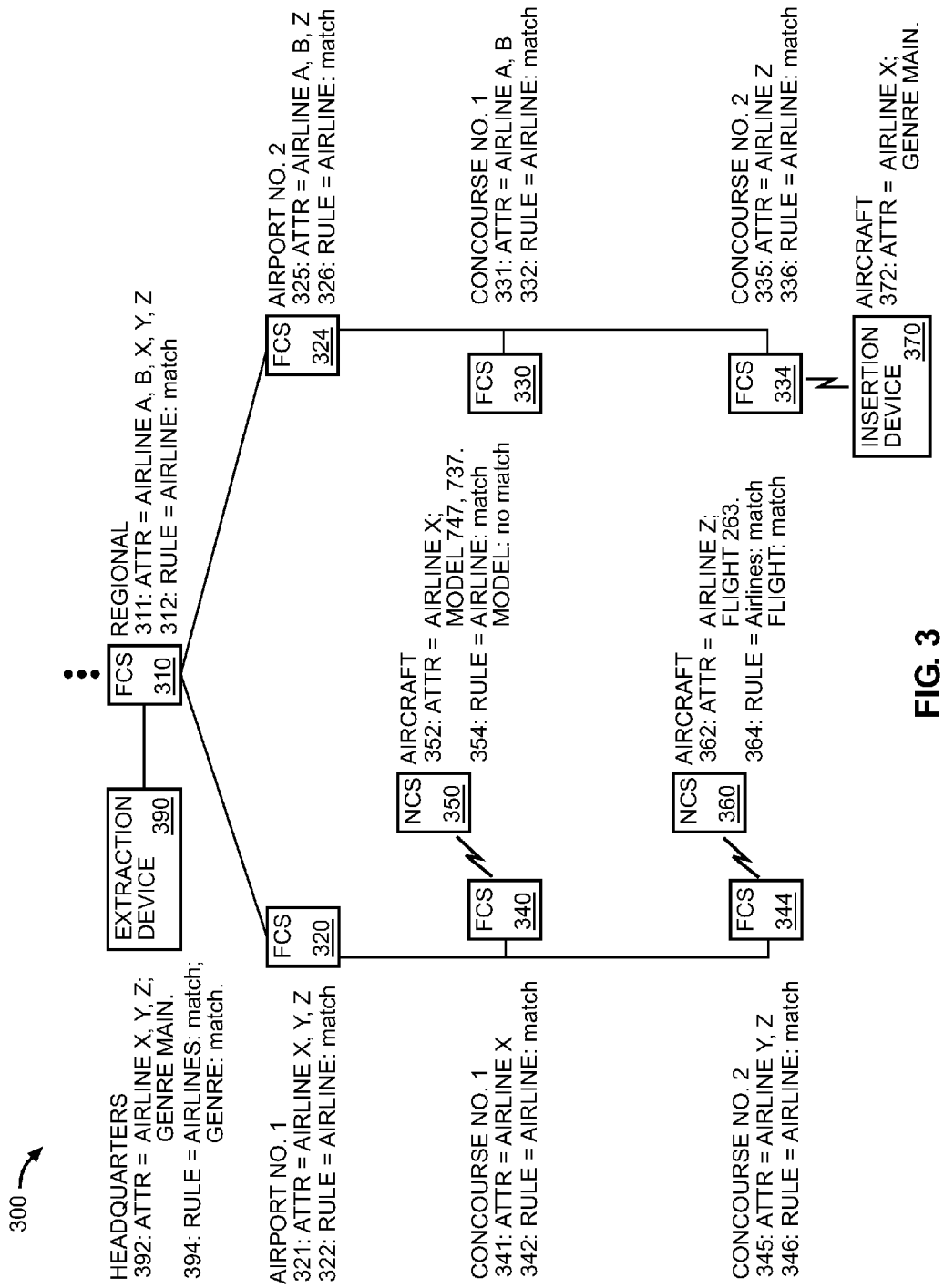
FIG. 3 is another functional block diagram of a hierarchy of servers for distributing content according to various aspects of the present invention.
Figure 4:
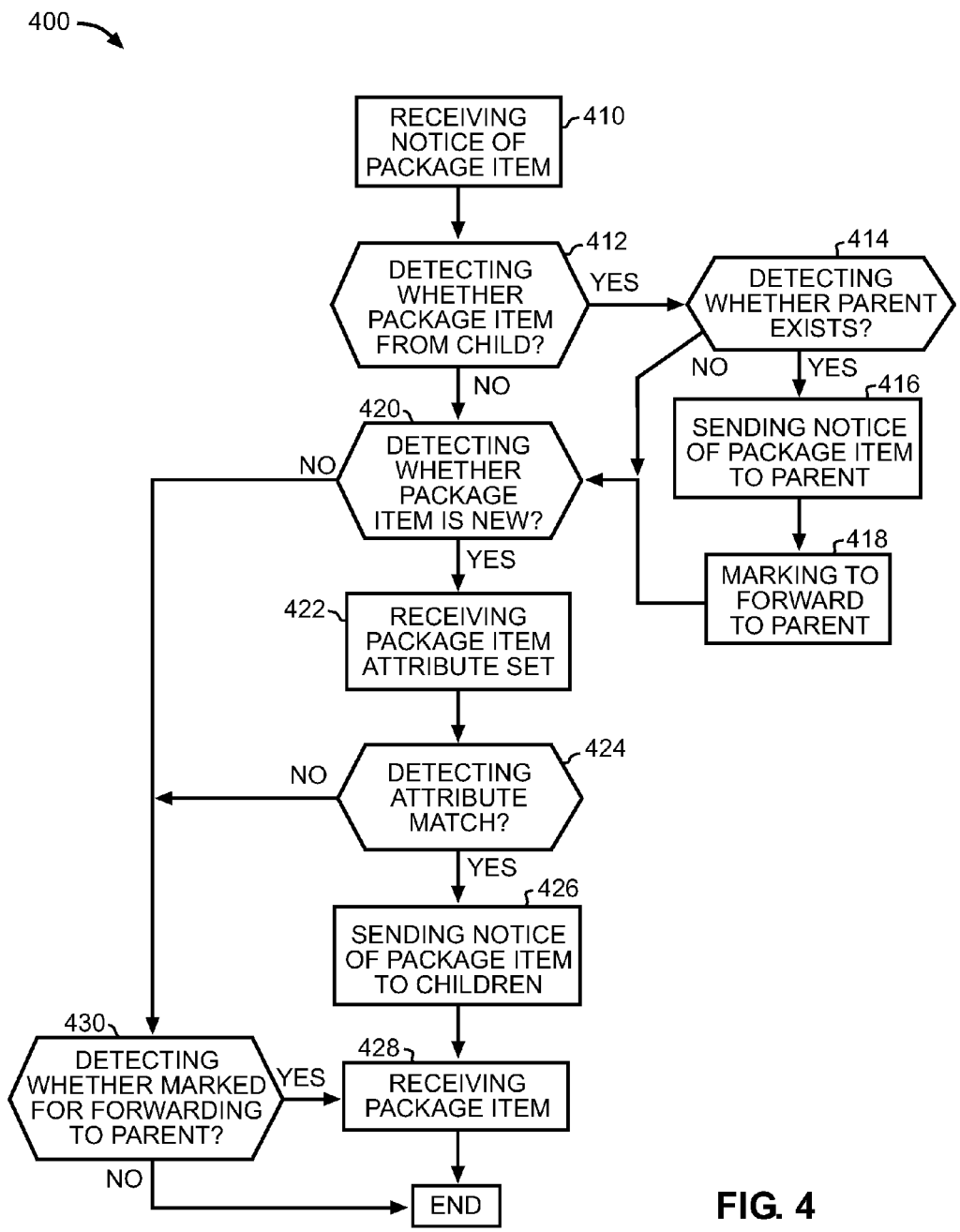
FIG. 4 is a method for distributing content in accordance with a set of attributes according to various aspects of the present invention.
Figure 5:
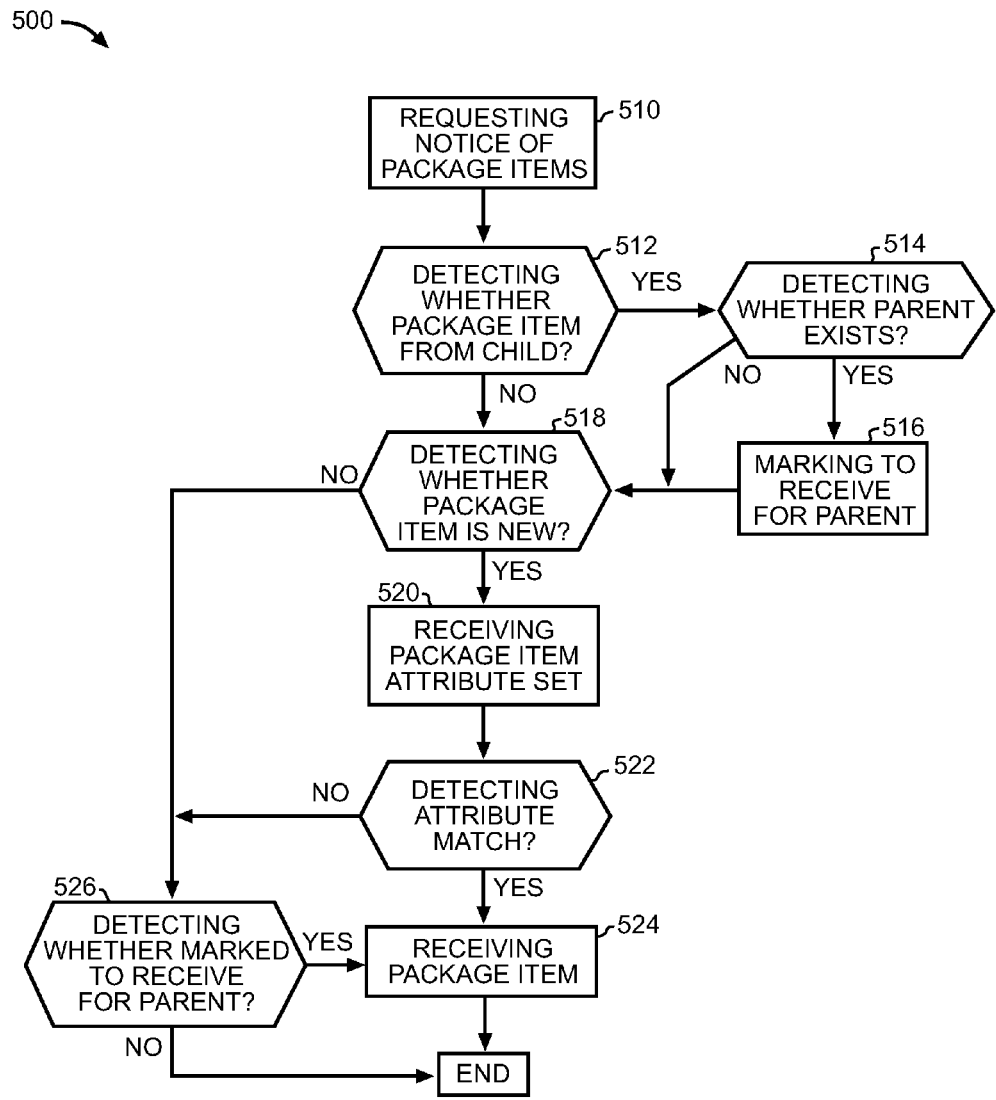
FIG. 5 is another method for distributing content in accordance with a set of attributes according to various aspects of the present invention.
Figure 6:
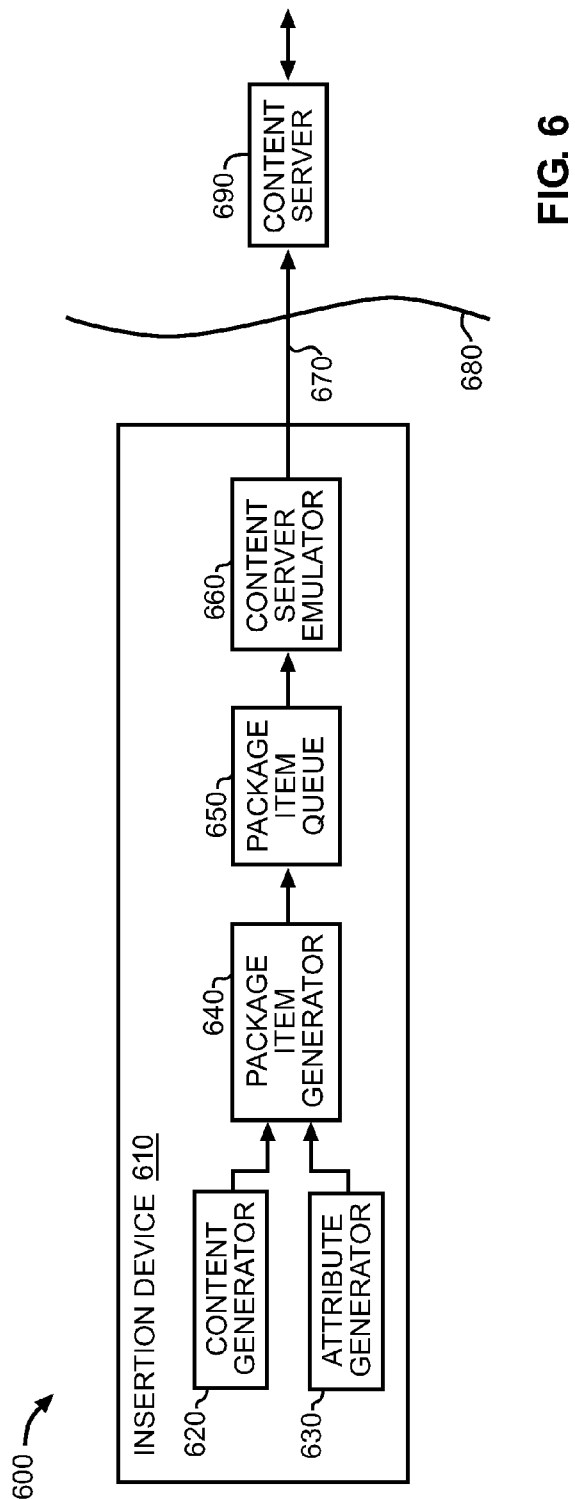
FIG. 6 is a function block diagram of a system for inserting content and an associated set of attributes according to various aspects of the present invention into a network for distribution.
Figure 7:
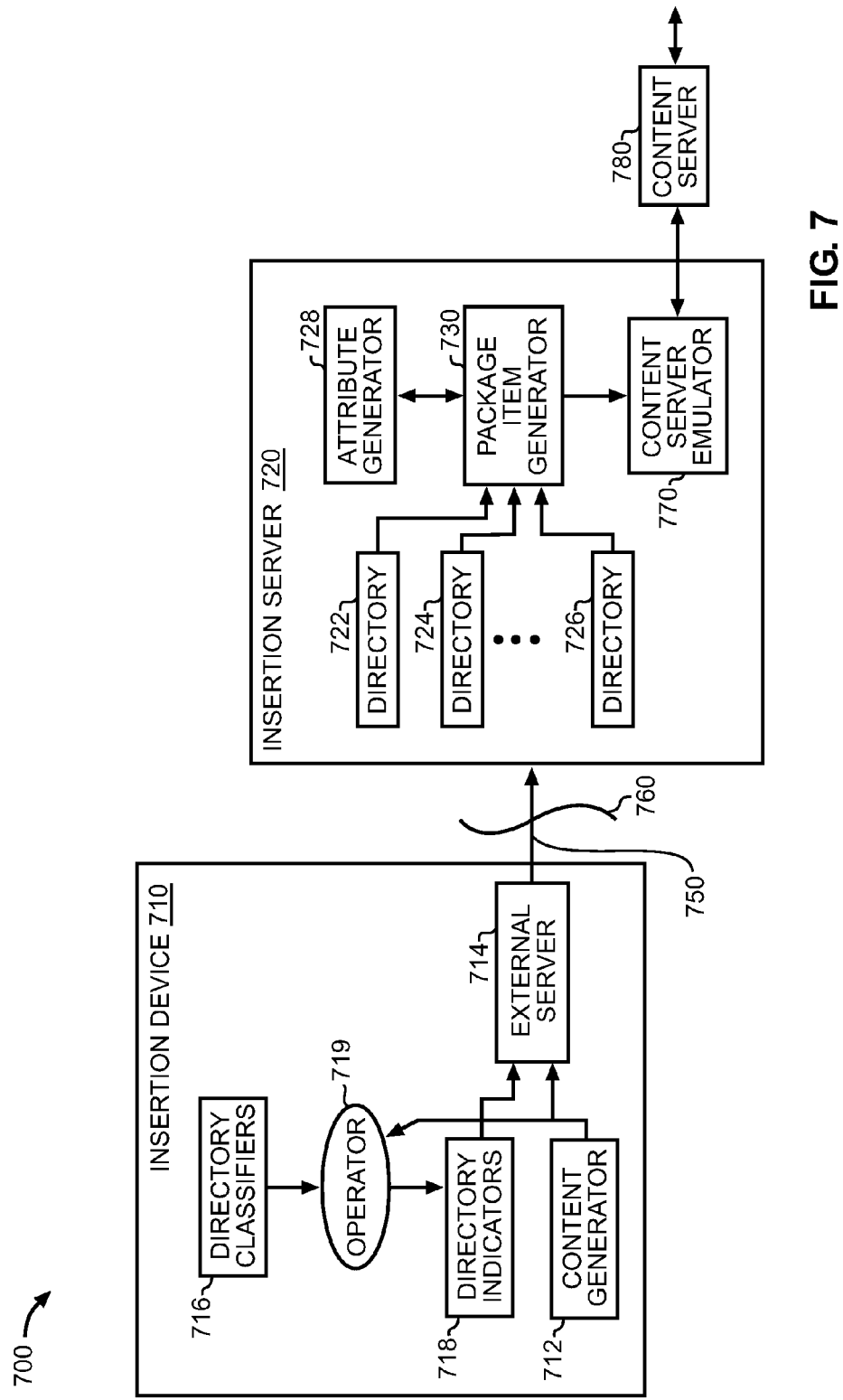
FIG. 7 is another function block diagram of a system for inserting content and an associated set of attributes according to various aspects of the present invention into a network for distribution.
Figure 8:
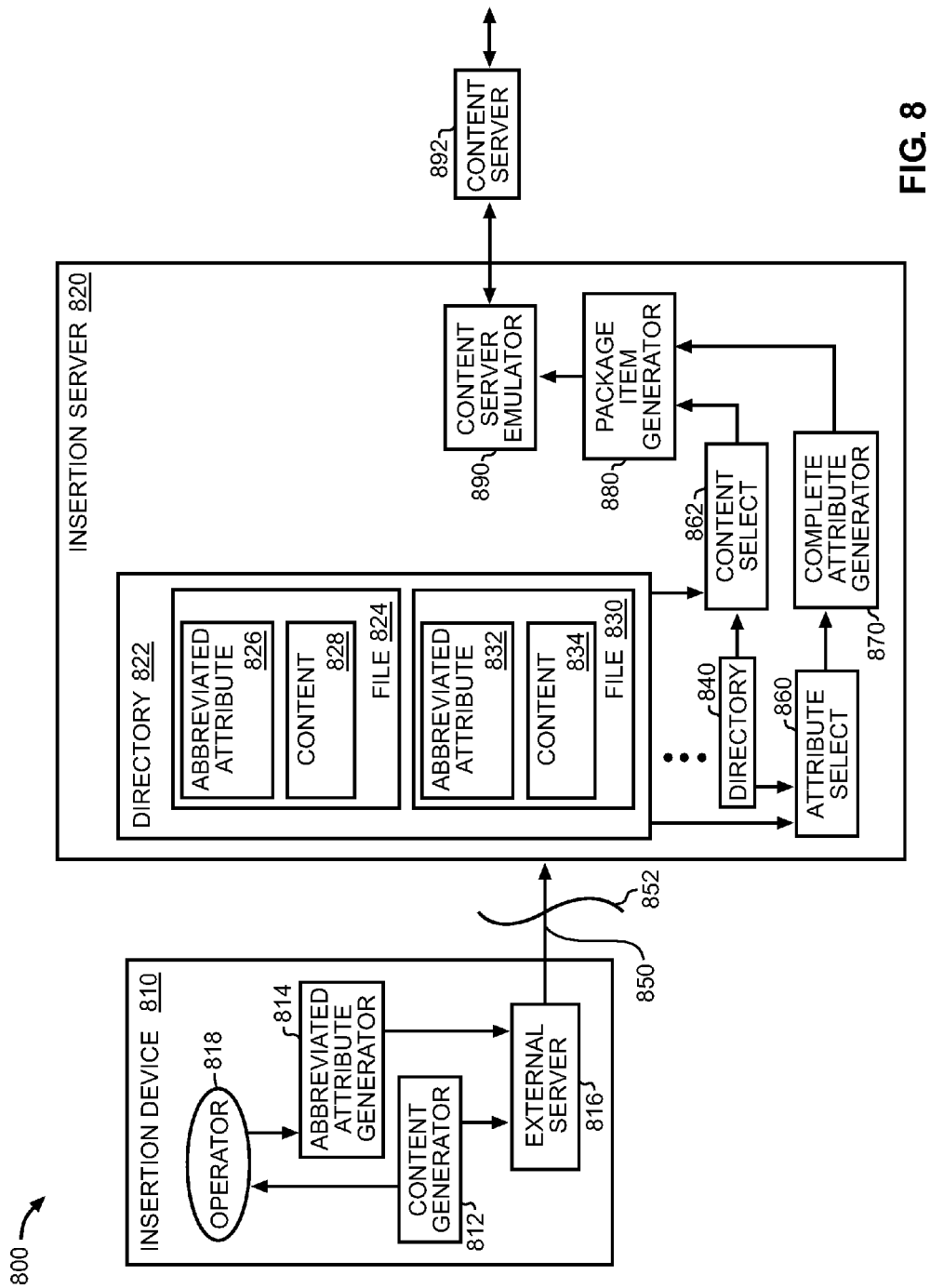
FIG. 8 is another function block diagram of a system for inserting content and an associated set of attributes according to various aspects of the present invention into a network for distribution.
Figure 9:
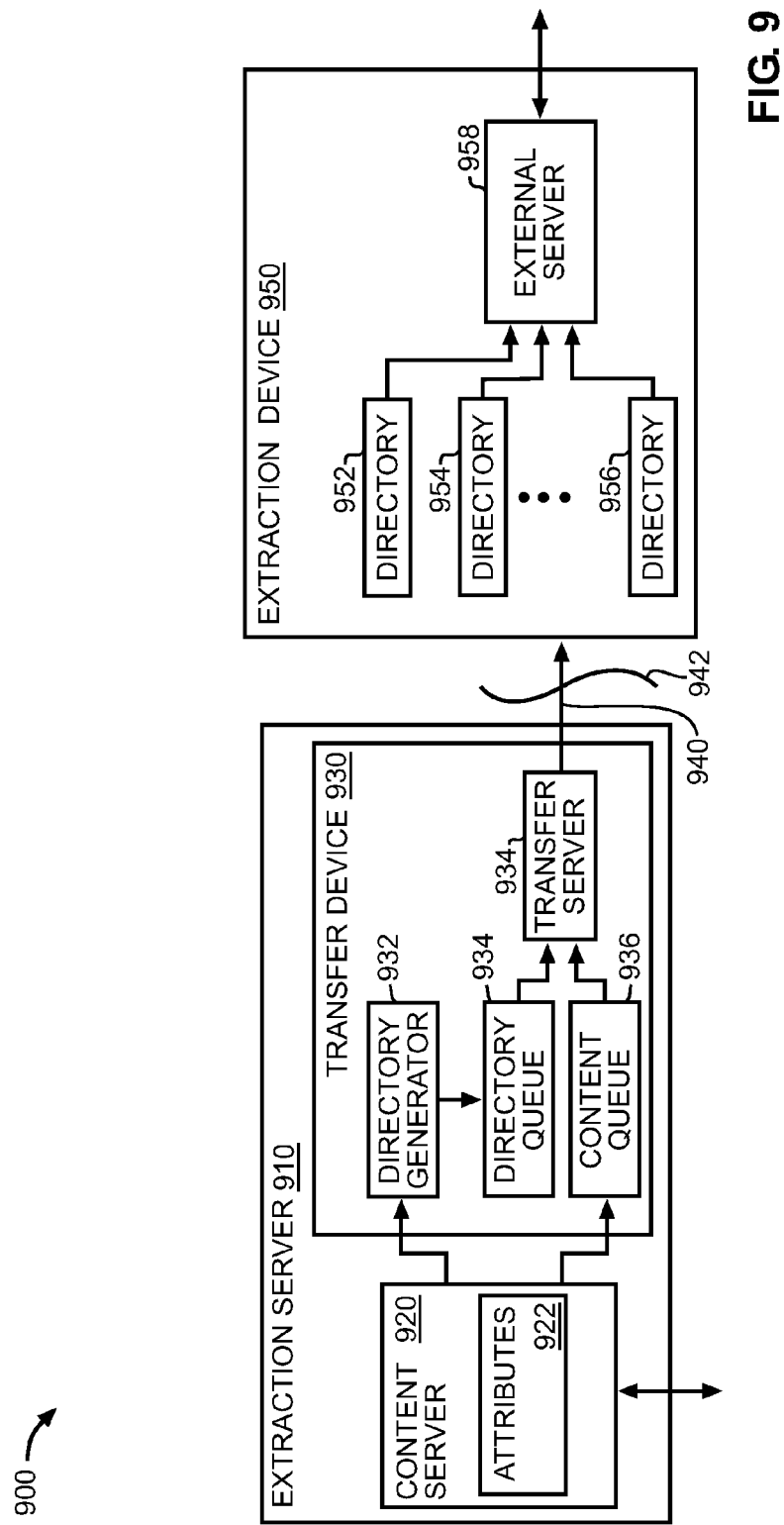
FIG. 9 is a function block diagram of a system for extracting content from a network in accordance with a set of attributes according to various aspects of the present invention.

A computer (e.g., processing circuit, server, workstation) may store, provide (e.g., transmit, transfer), and/or receive content. A computer that stores, provides, and/or receives content is herein referred to as a content server. A content server may communicate (e.g., provide, transmit, receive) content via a conventional network (e.g., IEEE 802.3 Ethernet, IEEE 802.11 wireless LAN, IEEE 802.13 100Baxe-X, IEEE 802.16 WiMax, Bluetooth, optical). A computer may include any conventional device (e.g., base station, access point, router, hub, switch, application software) for communicating content. A communicating device may include any conventional transducer (e.g., pressure, altitude, fuel gauge, temperature, stress, strain gauge, rpm). A content server may receive content from storage media (e.g., disk drive, USB drive, CD ROM).

A vehicle may include a content server. A content server on (e.g., in, a part of, contained within, position on, located in) a vehicle is herein referred to as a nomadic content server or a nomadic server. A content server that does not move or moves infrequently is referred to herein as a fixed content server, fixed server, stationary content server, stationary server, infrastructure content server, and/or infrastructure server. The phrase content server without the modifiers fixed, stationary, infrastructure, and/or nomadic refer to both fixed and nomadic content servers.

A nomadic content server may provide content to occupants of the vehicle. A nomadic content server may receive content from occupants of the vehicle, people who provide services to a vehicle (e.g., maintenance, loading, crew, owner, operator), and/or the vehicle itself (e.g., operating information, vehicle performance, vehicle system operation). A vehicle may provide content to a nomadic content server via transducers.

Content may include binary data, analog data, numbers, signals, characters, or any convention data and/or information. Content may be stored, subdivided, and/or organized in any conventional manner including as raw data (e.g., as received without being processed or organized), media (e.g., JPG, MPEG), documents, files, filing systems (e.g., hierarchical, flat), packets, and/or databases. Content may be used for any purpose including to entertain (e.g., movies, news, sports, documentaries, advertising, music), create a vehicle maintenance record, provide a record of vehicle operation, provide instructions to operators of the vehicle, and provide information about a destination of the vehicle.

In an implementation, content is organized as packages. A package contains a unit of content. A unit of content may include data for a movie, a musical number, a maintenance record, an equipment log, a crew training segment, a passenger manifest, and a baggage inventory. A package may be subdivided into one or more package items. A package item may include a document, a file, a packet, data, and/or content plus associated metadata organized in any conventional manner. A package item may include a file that contains all or a portion of the data for the unit of content. A package may include one or more package items. A package may further include metadata that describes the package. Package items of a package may be individually distributed through a network and reassembled at a content server to form the package. Package items may be numbered to show a sequence of a package item with respect to other package items. A package may include indicia of the total number of package items of the package. A content server may detect the arrival of each package item. A content server may detect the arrival of all package items.

Content may be distributed (e.g., sent, transmitted, provided, received, accepted transferred) via a network. Content may be distributed between content servers. For example, a content server may receive content from a content provider (e.g., movie studios, radio stations, content aggregators, vehicle owners, vehicle operators, destination operators, vehicle). One content server may provide content to another content server. One content server may provide content to multiple other content servers. A content server may provide content to a content consumer (e.g., vehicle occupant, vehicle owners, vehicle operators, destination operators, vehicle).

Content may be provided to a content server via a wired connection. A content server may receive content from storage media via a wired connection. A nomadic content server may receive content prior to installation in a vehicle. For example, a conventional personal computer (e.g., desk top, mobile) may function as a nomadic content server that receives content in one location, is transported to a vehicle, and operates as a nomadic content server once positioned in the vehicle. Prior to positioning the computer in a vehicle, the computer may receive content and attributes via a wired network, a wireless network, or a conventional bus (e.g., USB, 1394). Content and attributes may be stored on the computer hard disk drive. The computer may be physically transported to the vehicle thereby transporting the content stored on the computer hard drive. Such a nomadic content server is referred to as a "content mule." A content mule may be used in areas where using a network connection (e.g., wired, wireless) between a fixed content server and a nomadic content server positioned in a vehicle is expensive. The mule may receive content in an environment where transfer is inexpensive, then physically transported to the vehicle where the mule performs the functions of a nomadic content server.

While in route, a nomadic server may be limited (e.g., physical location, duration) in the manner in which the nomadic server may distribute content. For example, while in route, a nomadic content server may be disconnected from the network of fixed content servers and may not send content to or receive content from fixed content servers. While in route, a nomadic content server may be distant from other nomadic content servers thereby precluding establishing communication with other nomadic servers to distribute content. While in route, a nomadic content server may provide information to content consumers (e.g., extraction) and receive content from content providers (e.g., insertion) that are in the vehicle that carries the nomadic server. A nomadic server may establish communication with a network of fixed content servers or other nomadic servers at locations (e.g., airports, maintenance yards, stations, rest stops, fueling stations, bus terminals, train stations) along a route. The time that a nomadic server stops at a location where it may communicate with other content servers may be brief, so even when a nomadic server can establish a connection with other content servers, the duration of the communication may be limited.

Other factors may limit distribution of content to and from a nomadic server. The length of a route traveled by a nomadic server may be long (e.g., worldwide) and the locations where a nomadic server may stop en route to establish communication with other content servers may be separated by large distances. The network between fixed servers at the various locations where the nomadic server may stop may be slow (e.g., low data transfer rate), intermittent (e.g., unreliable), and/or costly to use. Furthermore, the amount (e.g., bytes) of content for transfer to and/or from a nomadic content server may be large (e.g., gigabytes, megabytes) such that content may not transit the network to a content server at a location if sent just prior to the arrival of the nomadic content server at the location.

Considering the limitations of providing content to and receiving content from a nomadic server, content may need to propagate through a network of content servers so that content intended for a specific nomadic server arrives at a location where the nomadic server will stop before the arrival time of the nomadic server at the location. Distribution of content through a network and between content servers may be accomplished in accordance with a schedule of the movements of nomadic servers. Distribution of content to a location where a nomadic server may stop and may establish communication with other content server may be accomplished by distributing content in accordance with one or more attributes. An attribute may incorporate the schedule and/or locations of movement of a nomadic server. An attribute may include a characteristic (e.g., quality, description) of a vehicle that carries a nomadic server.

For example, system 100 for distributing content between content servers may include AirSync Server 110; fixed content servers 140, 142, 144, 146, and 148; one or more content provider 130; and one or more schedule provider 120; network 170; and nomadic server 150.

An AirSync Server includes one or more servers and software applications deployed on content servers and communication equipment for provisioning the network, provisioning users, monitoring network performance, providing quality of service in accordance with provisioning, managing throughput, and measuring performance of system 100 and components of system 100. An AirSync Server may detect whether a server is connected to the network. An AirSync Server may detect whether a content server is connected to the network.

Content servers 140, 142, 144, 146, 148, and 150 may perform the functions of a content server as discussed above. Content server 142, 144, and 146 are positioned at distinct physical location nos. 1, 2, and N respectively. One or more contents servers may be positioned at each physical location.

Nomadic server 150 may travel a route that includes stops at locations 1, 2 and N. A nomadic server need not stop at each location where a fixed server of a network of servers is located. The locations where a nomadic server stops may correspond to a schedule of transit such as an airline, train, or bus schedule. Nomadic server 150 may establish communication with content servers 142, 144, and 146 via communication link 160, 162, and 164 respectively at locations 1, 2 and N respectively. A nomadic server may establish communication with a content server while the nomadic server is positioned at the physical location of the content server.

A medium of communication may determine the distance between a nomadic server and a fixed server for establishing communication. Communication over wired connection may require a wire to extend directly from the physical location to the nomadic server. A wireless connection may permit communication at a greater distance. For example, a wired connection may require an airplane to be positioned at a gate of an airport to establish the connection. A wireless connection may permit communication with the airplane after landing, but prior to arriving at a gate. While a nomadic server is in transit between physical locations, the nomadic server may be out of range of all fixed server such that the nomadic server cannot communicate with any fixed server.

A schedule provider provides a schedule. A schedule may include timetable of the movements of one or more vehicles with their nomadic content servers. A schedule may include a time, a date, and a corresponding predicted location of a nomadic server. A time and date may indicate a time and date of arrival and/or departure of a nomadic server to and/or from a location. A schedule may provide an estimated duration that a nomadic server may stop at a location. A duration of a stop of a nomadic server at a location may be an indication of a duration of communication between a nomadic server and a fixed server at the location. A schedule provider may provide a schedule to content server.

Attributes associated with a content server and/or content may be selected in accordance with a schedule (e.g., itinerary). A value of an attribute may be set in accordance with a schedule. Content may be distributed to a fixed content server at a location in advance of the arrive of a nomadic content server by using attributes and attribute values set in accordance with a schedule. Attributes and attribute values may be set so that content is distributed to a content server at a physical location in advance of the arrival of a nomadic server.

A content provider provides content for distribution between and/or to content servers. Content provided by a content provider may be distributed in accordance with one or more attributes as discussed herein. A content provider may develop content using a system that is external to the network. A content provider may provide content to the network and content servers of the network via a process referred to below as insertion. A content provider may insert content and/or attributes for content into a network for distribution. A content provider may cooperate with a manager of a network to configure attributes for routing content.

In an implementation, schedule provider 120 provides a schedule to content server 148. The schedule provided by schedule provider 120 indicates date 1 and time 1 for arrival of nomadic server 150 at location no. 1, date 2 and time 2 for arrival of nomadic server 150 at location no. 2, and date N and time N for arrival of nomadic server 150 at location no. N. Duration 1, 2, and N, whether provided in the schedule or calculated from an arrival and departure time, provides a predicted duration of the stop of nomadic server at locations nos. 1, 2, and N respectively. A schedule may further provide information as to a predicted position (e.g., gate, bay) of nomadic server 150 at a location. Attributes associated with content may be configured in accordance with the schedule, predicted duration of a stop, and an amount (e.g., bytes) of content for delivery to progressively deliver content to nomadic server 150 as it arrives at location nos. 1, 2, and N. Attribute values of content may be configured to deliver an amount of data at each stop along the route of nomadic server 150.

In this example, nomadic server 150 may arrives at location no. 1 at date 1 and time 1. Nomadic server 150 remains at location no. 1 for duration 1. During duration 1, nomadic server establishes communication using link 160 with content server 142 and sends and/or receives content. After leaving location no. 1 and while en route to location no. 2, nomadic server is disconnected from content servers 140, 142, 144, 146, and 148. Nomadic server 150 arrives at location no. 2 on date 2 at time 2 and establishes communication with content server 144 via link 162 during duration 2 to send and receive content. Nomadic server continues along its route, stopping at various locations to send and receive content, until it arrives at location no. N. At location no. N, nomadic server 150 communicates with content server 146 to send and receive content via link 164 for duration N.

Content may be distributed to content servers 142, 144, and 146 for delivery to nomadic server 150 prior to the arrival of nomadic server 150 at a location. Because the amount of content for delivery to nomadic server 150 may be too much for transfer at a single location, content may be delivered to content servers along the route of nomadic content server 150 for incremental delivery to nomadic server 150 at each location. Content may further be distributed for timely delivery to a nomadic server. For example, while nomadic server 150 is in transit from location no. 1 to location no. 2, it does not receive content. A content provider may provide content (e.g., news) that occurred while nomadic content server 150 was travelling from location no. 1 to location no. 2. The timely content may be provided to content server 144 prior to arrival of nomadic server 150 at location no. 2. Upon arrival at location no. 2, nomadic server 150 receives the timely content for use in the vehicle that transports nomadic server 150. In such a situation, a content provider and/or a manager of the network may set the attributes of content for delivery to a specific fixed content server (e.g., 144) prior to the predicted arrival time of nomadic server 150.

In another example, all content that may need to be delivered to nomadic content server 150 is routed to content servers 142, 144, and 146. Because content servers 142, 144, and 146 store all data for delivery to nomadic server 150, a change in the duration that nomadic server 150 is at a physical location may be compensated for by the other fixed servers. For example, if duration 1 is larger than expected due to a delay, the content servers 144 or 146 do not need to deliver as much content. In another example, if duration 2 is short or zero due to an infrastructure issue such as equipment failure or excessive cost to establish link 162, content servers 142 and 146 may make up for providing little or no content at location no. 2. Nomadic content server 150 may track the amount of content received and report to a fixed server the remaining package items that should be delivered.

As discussed above, distribution of content between content servers may be accomplished using one or more attributes. A fixed content server may include a set of attributes. A set of attributes may include one or more attributes. Each attribute may have one or more values. A nomadic server may include a set of attributes. Content, in particular a package item, may include a set of attributes. A vehicle may include a set of attributes. An attribute of a vehicle may include a characteristic of the vehicle and/or a descriptor associated with a use of the vehicle.

The attributes of a nomadic server may include one or more of the attributes of the vehicle that carries the nomadic server. The attributes of a fixed server may include one or more attributes of the vehicles that carry nomadic content servers that may communicate at some time with the fixed content server. The attributes of a package item may include one or more attributes of the vehicle that may consume the content of the package item. In one implementation, a package item that includes an attribute related to a vehicle may be routed through a network of fixed servers for delivery to a nomadic server that on a vehicle.

As discussed above, a nomadic content server may be positioned on a vehicle. A vehicle may include one or more attributes. An attribute for a vehicle may include a vehicle identification number, an operator identifier, a vehicle owner identifier, and/or a function of a vehicle.

For example, in the case of an airplane, a vehicle attribute may include a tail number, a type, a model, a vendor, an airline that operates the airplane, a flight number, a home airport, a present airport, and a gate number. In the case of a maintenance vehicle, a vehicle attribute may include maintenance specialty (e.g., electrical, plumbing, roofing), a vehicle number, a job number, a job description, job type, and a destination. In the case of a train, a vehicle attribute may include a train number, a track, a direction of travel, a destination, a haul identifier (e.g., local, long distance), and a station identifier.

A value for an attribute may be provided by network server (e.g., AirSync), a vendor of equipment (e.g., content server, vehicle), a content provider, a content server that receives content from a content provider (e.g., insertion server), a vehicle operator, a vehicle owner, a system user.

Attributes for a fixed server, a nomadic server, and content (e.g., package, package item) may include the same and/or different attributes. An attribute may provide information about a content server, communication equipment, a system external to the content server network, a location, a position at a location, a geographic coordinate, a vehicle, a vehicle owner, a vehicle operator, a purpose of a vehicle, an assignment of a vehicle, and a route.

An attribute of a package item may be related to the content of the package item. For example, an attribute of a package item may include a description of the content (e.g., video, music, data). An attribute of a package item may be unrelated to the content of the package item. For example, an attribute of a package item may be a vehicle attribute.

Attributes and/or values of attributes for content servers may be fixed, static, or dynamic. A fixed attribute is an attribute whose value does not change over the life of the equipment (e.g., content server, vehicle). A fixed attribute value may be set by an equipment manufacturer, a person who configures a system (e.g., network, content server), and/or a manager of the network.

A static attribute may include attributes whose values are set upon initialization of a content server. Static attributes include attributes values that are configured by a user and/or network manager while initializing a device.

Dynamic attributes may include attributes whose values change over time. The value of a dynamic attribute may change responsive to the operation (e.g., use) of a vehicle, a change in schedule, and/or a change in the network. Values for dynamic attributes may be provided by systems of the vehicle, the vehicle operator, and/or the system operator (e.g., manager). The value of dynamic attributes may be reported to the server (e.g., server 110, 210). Some attributes are required in a set of attributes while others are not.

The value of an attribute may be referred to as an attribute as opposed to an attribute name and a value for the attribute name.

In an implementation that distributes content to aircraft, a set of attributes for a fixed content server may include the attributes provided in Table 1. A fixed content server may include some or all of the attributes of Table 1 through Table 4.

TABLE 1

Attributes for a Fixed Content Server

| Attribute Name | Type | Description |
| --- | --- | --- |
| Universal Unique Identifier (UUID) | Fixed | A unique identifier of the content server. May be provided by an equipment |

TABLE 1-continued

Attributes for a Fixed Content Server

| Attribute Name | Type | Description |
| --- | --- | --- |
| or content server identifier | | manufacturer or a user who configures a system. |
| Device type | Fixed | Content server type. |
| Device model | Fixed | Content server model. |
| Device vendor | Fixed | Content server vendor. |
| External system ID (e.g., TopEffects!) | Static | Unique identifier of an external system served by the content server. Not required of the content server does not service an external system. |
| External system software revision | Static | Software revision of external system. Not required of the content server does not service an external system. |
| Content server area | Static | An area code for network partitioning. The value and range of the code depends on the subdivisions of a geographic area (e.g., entire planet, a continent, a country, a region). |
| Gate number | Static | The gate number (e.g., gate at an airport) at which the content server is located (e.g., deployed, positioned). This value may not be applicable to content servers not located proximate to a gate. |
| Airport | Static | Airport at which the content server is located. This value may not be applicable to content servers not located proximate to an airport or that distributes content to more than one airport. |
| Geographic coordinate | Static | A coordinate (e.g., lat/long, UTM) that describes the geographic location of the content server. |
| Industry alliance | Static | Name of industry alliance associated with the aircraft. |
| Airline | Static | Name of airline that operates the aircraft. |

In an implementation that distributes content to aircraft, a set of attribute for a nomadic content server may include some or all of the attributes of Table 2. A set of attributes for a fixed content server may further include any or all of the attributes of Table 2. A set of attributes for a nomadic content server may further include some or all of the attributes provided in Tables 3 and 4.

Attributes for a vehicle that carries (e.g., transports, moves) a nomadic content server may include some or all of the attributes provided in Table 2. For example, an aircraft may include attributes and the associated values for aircraft tail number, aircraft type, aircraft model, aircraft vendor, aircraft configuration, on-board system identifier, and on-board system software revision. A value of an attribute for a nomadic contents server may be the same as the value of the attribute for the vehicle that carries the content server.

TABLE 2

Attributes for a Nomadic Content Server

| Attribute Name | Type | Description |
| --- | --- | --- |
| Aircraft tail number | Fixed | A unique identifier used to identify the content server located on the aircraft. |
| Aircraft type | Fixed | Type of aircraft. |
| Aircraft model | Fixed | Model of aircraft. |
| Aircraft vendor | Fixed | Vendor of aircraft |
| Industry alliance | Static | Name of industry alliance associated with the aircraft. |
| Airline | Static | Name of airline that operates the aircraft. |
| Aircraft configuration | Static | Indicates the type of flights provided by the aircraft (e.g., long-haul, regional, charter) |

TABLE 2-continued

Attributes for a Nomadic Content Server

| Attribute Name | Type | Description |
|---|---|---|
| On-board system identifier | Static | A unique identifier of the on-board system served by the nomadic content server. On-board systems may include in-flight entertainment systems that receive content from the nomadic server. On-board systems may further include crew and/or aircraft systems that provide content to the nomadic content server. |
| On-board system software revision | Static | Software revision of the on-board system. |
| Content server area | Static | An area code for network partitioning. The value and range of the code depends on the subdivisions of a geographic area (e.g., entire planet, a continent, a country, a region). |
| Home airport | Static | Name of airport at which the airplane is based. |
| Flight number | Dynamic | The flight number presently assigned to the aircraft. The flight number is provided by the airline. |
| Gate number | Dynamic | Gate number at which the aircraft is presently positioned. |
| Present airport | Dynamic | Name of airport at which the aircraft is presently positioned. |
| Flight segment/city pair | Dynamic | Flight configuration (e.g., arrival/departure airport names) |
| On airport | Dynamic | The value of this attribute indicates whether the aircraft is positioned at the airport identified by the attribute "present airport." The attribute may further indicate whether the aircraft is on the tarmac (e.g., wheels-on-ground); on the taxiway, on the runway, or at the gate. Systems of the aircraft may provide information and/or signals to produce the values of this attribute. |
| Unfinished package item identifier | Dynamic | A package may include a number of package items. Package items in a package may be identified by package item identifiers. A list of package item IDs may be provided to a nomadic content server, so the nomadic content server may verify receipt of each package item of the package even though delivery may be interrupted or non-sequential. The unfinished package item identifier is one or more a packet item IDs of a package that a nomadic content provided has not received. |
| Missing chunk number | Dynamic | A package having more than one package item may be group the package items into chunks (e.g., groups) for delivery. A group may include one or more package items. A nomadic content receiver may receive some chunks at one geographic location and other chunks at other geographic locations until all the chunks have been received. Missing chunk number tracks the identifiers (e.g., number) of the chunks of a package that have not been yet received. |

A set of attribute for a package item may include the attributes provided in Table 3. Attributes for a package item may be mandatory (e.g., required) or not mandatory (e.g., not required). A set of attributes for a package item may further include some or all of the attributes provided in Tables 1 and 2. A set of attributes for a package item may include attributes of a vehicle that carries a nomadic content server.

TABLE 3

Attributes for a Package Item

| Attribute Name | Mandatory | Description |
|---|---|---|
| Package identifier | Yes | Identifier for the package to which the package item belongs. A package identifier may be unique or may be combined with the package item identifier to form a unique identifier. |
| Package item identifier (e.g., packet item ID) | Yes | Identifier for the package item. A package item identifier may be unique or may be combined with the package identifier to form a unique identifier. |
| Package item sequence number | Yes | The sequence number of the package item in the package. |
| Last package item notification | Yes | Notification of the last package item of a package. |
| Size | Yes | Size in bytes of the package item data file. |
| Activation date | Yes | The date that the distribution of the package item to content servers should begin. The activation date may be defined as a duration (e.g., number of days) after the creation date. |
| Delivery date | Yes | The date by which delivery of the package item to all content servers that should receive the package item should be complete. The delivery date may be defined as a duration (e.g., number of days) after the creation date. |
| Expiration date | Yes | The date after which the package item will not longer be valid. The expiration date may be defined as a duration (e.g., number of days) after the creation date. |
| Date last modification | Yes | Timestamp of last modification made to the package item data and/or attribute. |
| MD5 checksum | Yes | MD5 (e.g., cryptographic hash) checksum of the package item data file. |
| Priority | Yes | Delivery priority of the package. Each package item of a package has the same priority. |
| Package item type | Yes | The type of content in the package item. |
| Package name | No | A name of the package. |
| Source | No | The external system ID of the external system that originally provided the content. |
| Creator | No | The person responsible for creating the package. |
| Creation date | No | Date and time of original creation. |
| Package item name | No | Name of package item. |
| Package item description | No | An extended description of the package item. |
| Genre | No | Genre of content in the package (e.g., news, movie, music, firmware, maintenance data, flight information, crew information). |
| Pre-distribution script | No | List of actions for execution prior to transmitting the package item. |
| Post-distribution script | No | List of actions for execution after transmitting the package item. |

A set of attributes for a package item may further include attributes for distributing the package item between content servers. Attributes used for distributing a package item may include any attribute assigned to a content server (e.g., fixed, nomadic). In an implementation that distributes content to aircraft, additional attributes for a package item may include some or all of the attributes provided in Tables 1, 2, and 4.

TABLE 4

Additional Attributes for a Package Item

| Attribute Name | Mandatory | Description |
|---|---|---|
| Airline | No | Name of airline or airlines that may receive the package item. |

TABLE 4-continued

Additional Attributes for a Package Item

| Attribute Name | Mandatory | Description |
| --- | --- | --- |
| Aircraft type | No | Type of aircraft that may receive the package item. |
| Aircraft model | No | Model of aircraft that may receive the package item. |
| Industry alliance | No | Name of industry alliance whose aircraft may receive the package item. |
| Airport | No | Name of airport where content servers are located or may be located in the future that may receive the package item. |
| Gate number | No | Gate number at which package item may be delivered. Used in conjunction with airport to uniquely identify the gate location. |
| Flight number | No | Flight number of aircraft that may receive the package item. |

Packages may be distributed throughout a network of content servers using attributes. A content server may assess the attributes of a package and/or package item to determine whether the content server should take an action. An action may include storing the package item, forwarding the package item, providing a notice regarding the package item, and deleting the package item.

A content server may take an action in accordance with a result of assessing an attribute. A content server may use a rule to assess the attributes of a package item. A rule may include any type of formula. A rule may include mathematical and/or Boolean formulas. A rule may be applied to the attributes of a content server and/or the attributes of a package item. A rule may provide a result in accordance with applying the rule. A rule may detect one or more attribute of a set of attributes. A rule may detect one or more values of one or more attributes. A rule may provide a result in accordance with detecting. A rule may compare all or a portion of the attributes and/or values of attributes of a content server and a package item. A rule may provide a result in accordance with comparing. A content server may take an action based on a match condition or a no match condition of applying a rule.

In an implementation, network 200, according to various aspects of the present invention, includes server 210; fixed content servers 220, 222, 224, 226, 228, 230, and 232; nomadic content servers 250, 252, 254, 256, and 258; content insertion devices 270 and 272; and content extraction device 278.

Fixed content servers 220, 222, 224, 226, 228, 230, and 232 may perform the functions of a fixed content server described above. Fixed content servers 220, 222, 224, 226, 228, 230, and 232 include set of attributes 234, 236, 238, 240, 242, 244, and 248 and rules 235, 237, 239, 241, 243, 245, and 249 respectively. The acronym "FCS" may be used to indicate a fixed content server.

Nomadic content servers 250, 252, 254, 256, and 258 may perform the functions of a nomadic content server described above. Nomadic content servers 250, 252, 254, 256, and 258 include set of attributes 260, 262, 264, 266, and 268 and rules 261, 263, 265, 267, and 269 respectively. The acronym "NCS" may be used to indicate a nomadic content server.

Content insertion device 270 and 272 perform the functions of an insertion device discussed below. Content insertion device 270 and 272 in cooperation with content server 232 and 230 respectively may perform the functions of an insertion system (e.g., 600, 700, 800) discussed below. Content extraction device 278 performs the functions of an extraction device discussed below. Content extraction device 278 in cooperation with content server 220 may perform the functions of an extraction system (e.g., 900) discussed below.

A content insertion device (e.g., 270, 272) and a content extraction device (e.g., 278) may cooperate with any nomadic content server (e.g., 250, 252, 254, 256, 258) to insert content provided by a vehicle and extract content from a package item for use by the vehicle.

Server 210 may perform the functions of an AirSync Server discussed above. A server may communicate with one or more contents servers of network 200. A server may communicate with a content server using any conventional communications protocols, network and/or channels. In an implementation, server 210 communicates with network 214 over link 212. Content server 220 communicates with network 214 over link 216. A link may be wired or wireless. A network may include a private network and/or the internet.

Each content server may communicate with one or more other content servers, insertion devices, and/or extraction devices. A content server may communicate using any conventional communications protocols, network, channels, and/or medium (e.g., wired, wireless). A content server may communicate using one or more channels to provide half-duplex or full-duplex communication. A content server may establish a dedicated link for communication or may share a link. A content server may communicate over a network. One or more content servers may communicate over the same network.

For example, communication connection 218 between content server 220 and content server 226 may be a direct wired and/or wireless connection or may include a network and links to the network, of which network 214 and links 212 and 216 are an example. Communication connections between other content servers may be similar to communication connection 218. All links between contents servers may communicate through a network such as network 214. A link depicted as a "lightning bolt" represents a wireless connection.

Content servers may be organized for distribution of content in any conventional manner. In an implementation, the content servers of network 200 are organized in a parent-child relationship with respect to each other. For example, content server 220 communicates with children contents servers 222, 224 and 226 and extraction point 278. Content server 224 communicates with children content servers 228 and 230. Content server 228 communicates with child content server 232. Content server 232 communicates with insertion device 270. Content server 230 communicates with children content servers 256 and 258 and insertion point 272. Content server 222 communicates with children content servers 250, 252, and 254.

An insertion device may provide content to a network of content servers. An insertion device may originate content. An insertion device may provide content originated from a source external to the network. An insertion device may provide a set of attributes associated with content. An insertion device may provide content as one or more package items. Each package item may include a set of attributes. An insertion device may provide content without a set of attributes and a receiving content server may provide a set of attributes for the content.

For example, insertion device 270 and 272 may include content 275 and 277 respectively. Insertion device 270 and 272 assign set of attributes 274 and 276 to content 275 and 277 respectively. Content 275 and 277 may change. Attributes 274 and 276 may change in accordance with a change in content 275 and 277. Insertion device 270 (272) provides content 275 (277) and attribute 274 (276) to fixed content server 232 (230). Fixed content server 232 (230) distributes content 275 (277) throughout network 200 in accordance with attribute 274 (276). Additional information regarding insertion devices and the insertion of content and attributes into a network is discussed below.

An extraction device may receive content from a network of content servers. An extraction device may include a set of attributes to identify content for receiving at the extraction device. An extraction device may include a rule for assessing the attributes of a package item to determine whether to receive the package item. A rule may include the functions and characteristics of a rule as discussed above. An extraction device may cooperate with a content server to extract content from a network.

In an implementation, extraction device 278 includes set of attributes 280 and rule 281. Extraction device applies rule 281 to attribute 280 and to an attribute of a package item provided by fixed content server 220 to determine whether to receive the package item. Upon receipt of a package item, the content of the package item is transferred to content 282. The content of 282 changes at each receipt of a package item. Attribute 280 and/or rule 281 may change to receive package items having different attributes. Another implementation of an extraction device and an extraction system is discussed below.

In a network in which contents servers and/or extraction devices are organized in parent-child relationships, the set of attributes of a parent content server may include the set of attributes of all child (e.g., children, grandchildren, so forth) content servers and/or extraction devices beneath the parent content server. An attribute set of a parent server may include each attribute and/or attribute value for each child content servers to enable the parent to detect and forward content that should be received by the children of the parent. An attribute set of a parent may include a subset of the child attributes that in conjunction with a rule that permits the parent to accept for forwarding content that should be received by the children of the parent.

A network manager may initialize and maintain the attribute sets and values for the content servers in a network. Some values of an attribute set for a content server may be deduced by operation of the network server or updated automatically by server 210.

A parent content server may receive content in accordance with the attributes of the children content servers and/or extraction devices beneath the parent content server. A parent content server may forward content to a child content server and/or extraction device in accordance with the attributes of the child content server and/or extraction device. A parent content server may receive content in accordance with attributes of a child content server and/or extraction device and provide content responsive to a request from a child content server and/or extraction device.

For example, attribute 234 and rule 235 of content server 220 includes the set of attributes and rule from fixed content servers 222, 224, 226, 228, 230, 232, nomadic content servers 250, 252, 254, 256, and 258 and extraction device 278. Content server 220 may receive content in accordance with attributes and rule of the children content servers and extraction devices. Content server 220 may provide content to children in accordance with the attribute and rule of each child because content server 220 receives content for the children. A content server need not receive content that does not accord (e.g., match) with its set of attributes and rule. Because a parent content server receives content for its children content servers, a parent content server may also not accept content that the parent content server and the children content server do not wish to receive in accordance with their attributes.

A content server may receive and forward content that does not match the attributes of the content server to a parent content server for possible distribution to a content server where a match may be found. For example, content server 232 receives all content provided by insertion device 270 regardless of attribute 274 of content 275. Content server 232 applies rule 249 to attribute 248 and attribute 274. In the event of a match, content server 232 retains (e.g., stores) a copy of content 275. Content server 232 may further provide content 275 and attribute 274 to parent content server 228 in the event that a match may occur for another content server in the network. In the event that applying rule 249 to attribute 248 and attribute 274 does not result in a match, content server 232 provides content 275 and attribute 274 to parent content server 228 in the event that a match occurs for another content server that is higher in the parent-child hierarchy in the network. In a network organized in parent-child relationships, each content server that receives content that does not match its attributes in accordance with its rule, provides the content to its parent. Providing content with non-marching attributes to a parent may eventually distribute the content to a content server where a match does occur. Upon detecting a match, the content server may retain a copy of the content and distribute the content to the children of the content server where a match occurs.

Examples of how distribution of content in a network organized with parent-child relationships help provide an understanding of content distribution in accordance with attributes. The examples provided below do not limit the scope of the claims to the specific examples, but provide an example of one possible implementation of many possible implementations of a network that uses attributes to distribute content.

System 300 for distributing content, according to various aspects of the present invention, includes fixed content servers 310, 320, 324, 330, 334, 340, and 344. Content server 310 distributes content to a region. Its geographic position may be anywhere, but it communicates with content servers 320 and 324. Content servers 320 and 324 are children of content server 310. Communication between content servers 310, 320, and 324 may be accomplished using any conventional communication equipment and/or techniques.

Content server 320 distributes content to airport no. 1. It may be geographically positioned anywhere. Content server 320 communicates with content servers 340 and 344. Content servers 340 and 344 are children of content server 320. Communication between content servers 320, 340, and 344 may be accomplished using any conventional communication equipment and/or techniques.

Content server 324 distributes content to airport no. 2. It may be geographically positioned anywhere. Content server 324 communicates with content servers 330 and 334. Content servers 330 and 334 are children of content server 324. Communication between content servers 324, 330, and 334 may be accomplished using any conventional communication equipment and/or techniques.

Content servers 330, 334, 340, 344 communicate with nomadic content servers on aircraft that arrive at gates of their respective concourses. Content server 340 and 344 are positioned at concourse no. 1 and concourse no. 2 respectively of airport no. 1. Content server 330 and 334 are positioned at concourse no. 1 and concourse no. 2 respectively of airport no. 2.

Each content server includes a set of attributes and a rule. A set of attributes for a fixed and/or nomadic content server may include any attribute discussed in Table 1 through Table 4. In this example, fixed content servers 310, 320, 324, 330, 334, 340, and 344 include attribute sets 311, 321, 325, 331, 335, 341, and 345 respectively. Nomadic content servers 350 and 360 include attribute sets 352 and 362 respectively. Insertion device 370 includes attribute set 372. Extraction device 390 includes attribute set 392. Although attribute sets discussed above may include any attribute from Table 1 through Table 4, the attributes discussed in this example are: airlines, aircraft, genre, and flight.

Each content server and extraction device 390 may further include a rule. A rule for each content server and extraction device 390 may include the properties and function of a rule as described above. A rule is applied to attributes of a content server and a package item to determine whether a content server should take an action with respect to a package item. An action may include accepting (e.g., receiving), storing, and/or forwarding a package item.

Rules 312, 322, 326, 332, 336, 342, 346, and 394 for this example perform a comparison (e.g., logical, character, binary, Boolean) between each value of an attribute of a content server and each value of the attribute of a package item. A comparison that find a match (e.g., same, true, 1) indicates that the content server should receive the package item for forwarding to children content servers as discussed above. A comparison that does not find a match indicates that the content server should receive the package item for forwarding to the parent of the content server as discussed above.

For example, attribute set 311 includes the attribute "airline" having the values "A," "B," "X," "Y," and "Z." Rule 312 specifies that each value for the attribute "airline" of content server 310 should be compared to each value for the attribute "airline" of a package item. A match between a value of the content server "airline" attribute and a value of the package item "airline" attribute indicates that the content server receive the package item for forwarding to children content servers. Applying rule 312 using attribute 311 means that content server 310 will take an action for any package item that should be received by an aircraft of airlines A, B, X, Y, or Z.

In another example, attribute set 352 of content server 350 includes the attribute "model" (e.g., aircraft model) having the value 747 and 737. Rule 354 for content server 350 has the operation "no match" for the attribute "model." In this case, each value of the attribute "model" for content server 350 is compared with each value of the attribute "model" for a package item. In the event that the values of "model" for content server 350 do not match the values of "model" for a package item, content server 350 receives the package item. Because content server 350 does not have children content servers, content server 350 will receive the package item for its own use. Applying rule 354 using attribute 352 means that content server 350 will take an action on all package items that are not intended for aircraft model nos. 747 and 737.

As an example of distributing content, applying a rule, and taking an action, suppose that content server 310 receives a package item and/or a notice of a package item having the attributes and attribute values shown in Table 5. The package item may have other attributes and attribute values in addition to those shown in Table 5, but for this example, the attributes of Table 5 are discussed to illustrate distribution of a package item. The attributes of Table 5 are also attributes of an airplane. A package item having the attribute values of Table 5 is referred to herein as package item no. 1.

TABLE 5

Package Item No. 1 Attributes

| Attribute Name | Description |
| --- | --- |
| Airline | X |
| Aircraft model | 767, 777, A380, A350, A340. |

Upon receiving package item no. 1 or a notice that package item no. 1 is available for receipt, content server 310 receives and/or requests the attributes for package item no. 1. Attributes for a package item may be separate from or a part of the package item. In one implementation, the attributes of a package item are part (e.g., data field, meta data) of the package item, so the entire package item must be received to receive the attributes of the package item.

Content server 310 uses rule 312 to determine whether it should receive, or in this case retain and not delete, package item no. 1. In this example, as discussed above, attribute set 311 for content server 310 includes the attribute "airline" with the values A, B, X, Y, and Z. Content server 310 compares each value of attribute "airline" of attribute 311 to each value of the attribute "airline" of the attribute of package item no. 1. The comparison results in a match between the X value of attribute 311 and the X value of the attribute of package item no. 1. Because a match occurs as a result of applying rule 312, content server 310 receives and stores, or retains and does not delete, package item no. 1.

Because attribute 311 of content server 310 includes the values for the "airline" attribute of its children content servers (320, 324, 330, 334, 340, 344), at least one of its children will accept package item no. 1. As a result, content server 310 either sends package item no. 1 to content servers 320 and 324 or advises content servers 320 and 324 of package item no. 1, so servers 320 and 324 may request package item no. 1 or the attribute set of package item no. 1.

Content servers 320 and 324 perform a comparison between the values of attributes 321 and 325 respectively and the values of attributes of package item no. 1 as discussed above with respect to content server 310. A match occurs for content server 320, so content server 320 receives package item no. 1. A match does not occur for content server 324, so content server 324 does not receive package item no. 1 or if already received, discards package item no. 1. Because attribute "airline" of attribute 325 includes the values of its children content servers (e.g., 330, 333), if content server 324 does not detect a match when applying rule 326, content server 324 knows that no child will detect a match.

Because content server 320 detects a match when applying rule 322 to attribute 321 and the attribute of package item no. 1, content server 320 receives package item no. 1 and forwards package item no. 1 or a notice of package item no. 1 to content servers 340 and 344. Content server 340 applies rule 342 to attribute 341 and the attribute of package item no. 1 and detects a match, so content server 340 receives package item no. 1. Content server 344 applies rule 346 to attribute 345 and attribute of package item no. 1, but does not detect a match, so content server 344 does not receive or discards package item no. 1.

Content server 340 retains package item no. 1 for delivery to nomadic servers. Content server 340 may provide package item no. 1 to as many nomadic content servers that have matching attributes. Each nomadic server applies its rule to its own attribute and the attribute of package item no. 1 to determine if it should receive package item no. 1. In this case, nomadic server 350 detects a match while comparing the values of the "airline" attribute of attribute set 352 and the attribute set of package item no. 1. Nomadic server 350 also applies rule 354 to each value of the "model" attribute for attribute set 352 and the attribute set for package item no. 1. The "model" attribute for package item no. 1 does not include the value "747" or "737," so no match is found between the nomadic content server attribute and package item no. 1 attribute. Because rule 354 specifies "no match," nomadic content server 350 receives package item no. 1 because applying rule 354 to attribute set 352 and the attribute set for package item no. 1 indicates that nomadic content server 350 should receive package item no. 1 upon detecting a match for "airline" and no match for "model."

The lightning bolt symbol between content server 340 (344) and nomadic content server 350 (360) represents communication between the content server and the nomadic content server via a wireless communication channel.

Each server that has received a copy of package item no. 1 may retain a copy of package item no. 1. The value of attribute "expiration date" (not shown in Table 5) may provide a content server a time frame for retaining package item no. 1. In an implementation, a content server retains package item no. 1 until the local time is greater than the value of the expiration date attribute. In another implementation, only fixed content servers that communicate with nomadic content servers retain package item 1 for delivery to nomadic content servers. Other fixed contents servers that do not communicate with nomadic content servers receive and forward package item no. 1, but do not retain package item no. 1 after it has successfully been forwarded.

In another example of distributing content, applying a rule, and taking an action, suppose that content server 310 receives a package item and/or a notice of a package item having the attributes and attribute values shown in Table 6. The package item may have other attributes and attribute values in addition to those shown in Table 6. A package item having the attribute values of Table 6 is referred to herein as package item no. 2.

TABLE 6

Package Item No. 2 Attributes

| Attribute Name | Description |
| --- | --- |
| Airline | Z |
| Flight no. | 263 |

Upon receiving package item no. 2 or a notice that package item no. 2 is available for receipt, content server 310 receives and/or requests the attributes for package item no. 2. Content server 310 uses rule 312 to determine whether it should receive package item no. 2. In this example, as discussed above, attribute set 311 for content server 310 includes the attribute "airline" with the values A, B, X, Y, and Z. Content server 310 compares each value of attribute "airline" of attribute 311 to each value of the attribute "airline" of package item no. 2. The comparison results in a match between the Z value of attribute 311 and the Z value of the attribute of package item no. 2. Because a match occurred as a result of applying rule 312, content server receives package item no. 2.

Because attribute 311 of content server 310 includes the values for the "airline" attribute of its children content servers (320, 324, 330, 334, 340, 344), at least one of its children will accept package item no. 2. As a result, content server 310 either sends package item no. 2 to content servers 320 and 324 or advises content servers 320 and 324 of package item no. 2, so servers 320 and 324 may request package item no. 2 or the attribute set of package item no. 2.

Content servers 320 and 324 perform a comparison between the values of attributes 321 and 325 respectively and the values of attributes of package item no. 2 as discussed above with respect to content server 310. A match occurs for content server 320 and content server 324, so content servers 320 and 324 receive package item no. 2.

Content server 320 forwards package item no. 2 or a notice of package item no. 2 to content servers 340 and 344. Content server 324 forwards package item no. 2 or a notice of package item no. 2 to content servers 330 and 334.

Content server 340 applies rule 342 to attribute 341 and the attribute of package item no. 2, but does not detect a match, so content server 340 does not receive package item no. 2.

Content server 344 applies rule 346 to attribute 345 and attribute of package item no. 2. Content server 344 detects a match for the attribute "airline" because attribute 345 includes attribute "airline" with a value of "Z" and package item no. 2 includes attribute "airline" with a value of "Z." Attribute set 345 does not include the attribute "flight," so no comparison is made for the "flight" attribute of package item no. 2. Content server 344 receives package item no. 2 based on the match for the "airline" attribute.

Content server 330 applies rule 332 to attribute 331 and the attribute of package item no. 2, but does not detect a match, so content server 330 does not receive package item no. 2.

Content server 334 applies rule 336 to attribute 335 and attribute of package item no. 2. Content server 334 detects a match for the attribute "airline." Attribute set 335 does not include the attribute "flight," so no comparison is made for the "flight" attribute of package item no. 2. Content server 334 receives package item no. 2 based on the match for the "airline" attribute.

Content servers 344 and 334 retain package item no. 2 for delivery to nomadic servers. Each nomadic server applies its rule to its own attribute and the attribute of package item no. 2 to determine if it should receive package item no. 2. In this case, nomadic server 360 detects a match while comparing the values of the "airline" attribute of attribute set 362 and the attribute set of package item no. 2. Nomadic server 360 also applies rule 364 to each value of the "flight" attribute for attribute set 362 and the attribute set for package item no. 2. The value of the "flight" attribute of attribute 362 matches the value of the "flight" attribute of package item no. 2, so nomadic server 360 receives package item no. 2.

A flight number may be included as an attribute of a package item to provide distribution of a package item to a nomadic content server of an airplane assigned the particular flight number. In this case, package item no. 2 appears to be intended for flight no. 263; however, package item no. 2 may be received by any content server that does not provide a value for the "flight" attribute of its attribute set or that does not require a match of the "flight" attribute in its rule. Delivery of a particular package item to a particular nomadic server to the exclusion of other nomadic servers may be accomplished by providing attribute values for each nomadic content server that uniquely identify each nomadic content server or the vehicle that carries the nomadic content server, such as airline, gate number, flight number, model number, and/or tail number. A rule may also be fashioned to detect package items for a particular flight or aircraft.

Insertion device 370 provides content to network 300 for distribution. In this example, insertion device 370 is in an aircraft. A system (e.g., electrical, hydraulic, oxygen, fuel, propulsion, navigation, flight controls, ice protection, emergency, in-flight entertainment, crew, credit card transaction data, frame stress transducers, black box, strut position transducers) of the aircraft produces data. The data may be used to track maintenance, detect failures, assess crew performance, and/or measure system efficiency. Insertion device 370 may receive data from the systems of the aircraft and prepare the data for distribution via network 300.

Insertion device 370 may prepare data for distribution by organizing data into package items. Insertion device 370 may prepare a package item for distribution by preparing a set of attributes and assigning attribute values. A nomadic server of the aircraft may cooperate with the insertion device to prepare data for distribution. An owner or operator of the aircraft may be interested in receiving the data. The data may be provided by the aircraft and distributed through the network to an extraction device owned by the owner or operator of the aircraft. Attributes may be assigned to the package item that contains data, so that the package item is distributed to the extraction device.

In one implementation, insertion device 370 receives performance data from the aircraft engines. Insertion device 370 organizes the data into one or more package items. Insertion device 370 retains the package item until the aircraft arrives at a gate where insertion device 370 may establish communication (e.g., wireless) with fixed content server 334. Insertion device 370 is on an aircraft operated by airline "X," so insertion device 370 assigns the value "X" to the "airline" attribute of the attribute set 372 of the package item. Insertion device 370 also assigns the value "main" (e.g., maintenance) to the "genre" attribute to identify the package item as containing maintenance data. For this example, the package item formed by insertion device 370 is referred to as package item no. 3 and includes the attributes provided in Table 7. The package item may have other attributes and attribute values in addition to those shown in Table 7. In one implementation, all package items containing maintenance data are assigned at least the attributes shown in Table 7.

TABLE 7

| Package Item No. 3 Attributes | |
|---|---|
| Attribute Name | Description |
| Airline | X |
| Genre | Main (maintenance) |

Upon establishing communication with content server 334, insertion device 370 informs content server 334 that it has package item no. 3 for distribution. Content server 334 receives the package items or a notice of the package items and applies rule 336 to attribute set 335 and attribute set 372 of package item no. 3. In this case, content server 334 does not detect a match for the "airline" attribute.

In the previous examples of distributing a package item, a content server did not accept a package item when a match did not result from applying the rule. The previous examples showed distribution from parent to child. In each of the above examples, content server 310 received a package item (e.g., no. 1, no. 2). Because attribute set 311 includes the attribute and attribute values for distributing to the children content servers of content server 310, a resultant match from applying rule 312 informs content server 310 that it or one of its children should receive the package item. The same logic applies to content servers 320, 324, 330, 334, 340, and 344. The attribute set of each included attributes for distributing content to children content servers, so a match indicates that the content server should receive the package item for distribution to children content servers.

When a child content server receives a package item, especially a child content server at a lower level of the parent-child hierarchy, the child content server does not know the attributes of its parent content server. Lacking knowledge of the attributes of its parent, a child content server forwards all package items that the child receives independent of its parent to its parent.

In this example, using rule 336 content server 334 does not detect a match between attribute set 335 and attribute set 372. Lacking a matching result, content server 334 does not retain package item no. 3 for distribution to other nomadic content servers. However, content server 334 receives package item no. 3 and forwards it to content server 324. Content server 324 applies rule 326 to attribute set 325 and attribute set 372 and does not detect a match. Content server 324 does not retain package item no. 3, but forwards package item no. 3 to content server 310. Content server 310 applies rule 312 to attribute set 311 and attribute set 372 and detects a match.

Because content server 310 detects a match, content server 310 stores package item no. 3 for forwarding to its children servers. Because content server 310 did not receive package item no. 3 from its parent, content server 310 also forwards package item no. 3 to its parent.

When content server 310 provides package item no. 3 or a notice of package item no. 3 to extraction device 390, extraction device 390 applies rule 394 to attribute set 392 and attribute set 372 of package item no. 3. Extraction device 390 finds a match for the "airline" attribute and for the "genre" attribute, so extraction device 390 accepts package item no. 3. Extraction device 390 is located at the headquarters for airlines "X," "Y," and "Z." Headquarters desires to receive maintenance data for the aircraft of its fleet. Extraction device 390 may be located at any place in the network or at any level of the parent-child hierarchy.

As discussed above, upon detecting a match, content server 310 provides the package item or a notice of the package item to its children content servers. In the case of package item no. 3, content server 310 will provide package item no. 3 to content server 320 because it detected a match. Content servers 320 and 340 will detect a match between their respective attribute sets (i.e., 321, 341) because the attributes sets and rules do not check for a match with the attribute "genre." It is unlikely that any nomadic content server will use the data from package item no. 3; however, this example illustrates that the distribution of a package may be controlled by the attribute set of a content server, the attribute set of a package item, and the rule applied by the content server to compare the attribute sets. A content server may include attributes and rules that provide a no match result, so that the content server does not receive a package item. In this example, content server 320 may use a rule that excludes receiving maintenance data from its parent content server 310.

As discussed in the above examples, an attribute of a package item may not be related to the type of content in a package item. The attributes for package item nos. 1 and 2 include airline, aircraft model, and flight numbers. The attributes for package item nos. 1 and 2 do not include an attribute (e.g., package item type, genre) that provides information as to the type of content (e.g., video, audio, data) carried by package item. Distribution in accordance with an attribute or a set of attributes may be accomplished without knowledge of the type of content being distributed. An attribute may provide information as to the purpose of the content, so distribution using an attribute may include distribution in accordance with the purpose of the content. Attributes (e.g., airport, gate number, flight number) may result in distribution of a package item to a particular physical location. A physical location may not correspond to a geographic coordinate. For example, when distributing content by flight number, the physical location of where the content should be distributed may change if the origin or destination of the flight number is change.

Depending on the attributes used to distribute content, content may be distributed in accordance with the type of content (e.g., package item type, genre, package identifier, package item identifier), location of a fixed and/or nomadic content server (e.g., content server area, airport, gate number, geographic coordinate, flight number), vehicle (e.g., aircraft tail number, aircraft type, aircraft model, on-board system identifier), use of a vehicle (e.g., flight number, gate number, flight segment/city pair), ability to use and/or need for content (e.g., aircraft configuration, aircraft model, aircraft vendor, flight number, flight segment/city pair), vehicle owner (e.g., airline name, home airport), package specific information (e.g., package identifier, package item identifier, package name), and/or time related information (e.g., activation date, delivery date, expiration date, date last modification).

A method for distributing content in a network may include method 400. Distribution of content as discussed above may be accomplished via method 400. Method 400 may distribute package items in a network including a network having a parent-child hierarchy. Method 400 may include receiving notice of package item 410, detecting whether package item from child 412, detecting whether parent exists 414, sending notice of package item to parent 416, marking to forward to parent 418, detecting whether package item new 420, receiving package item attribute set 422, detecting attribute match 424, sending notice of package item to children 426, receiving package item 428, and detecting whether marked for forwarding to parent 430.

In distributing package items, content servers communicate (e.g., transmit, receive) information. Communication may occur between content servers including a parent content server and one or more children content servers. Information may include any data, signaling, control, and status communicated between content servers. For purposes of clarity while discussing distribution, a content server, whether a parent or a child, that receives a package item is referred to as the receiving content server. A server that provides the package item is referred to as the providing content server. Any content server may perform the role of a receiving or a providing content server. Process 400 may be performed by a receiving content server.

Receiving notice of a package item may include receiving a notice of all package items retained (e.g., stored, held) by the providing content server, receiving a notice of package items not yet reported by the providing content server, receiving a notice of package items receive since the last notice, and/or receiving notice of a single package item. A notice may include information (e.g., data) regarding a package item. A notice may include attributes of a package item. A notice may include the entire package item. A notice may identify each package item uniquely (e.g., package identifier). A notice may be communicate in any conventional (e.g., wired, wireless) manner using any conventional communication protocol. In one implementation, receiving a notice 410 includes receiving a list of package items retained by a providing content server, but not yet reported to a neighboring (e.g., parent, child) content server.

Detecting whether a notice of a package item has been received from a child includes receiving a communication via a channel dedicated to communication with a child server, receiving a identifier of the content server that sent the notice of a package item, and/or polling neighbor content servers to determine which content server sent notice of a package item. In one implementation, during initialization each child content server registers (e.g., checks-in) with the parent server and identifies itself with each communication. A parent content server may also identify itself to a child server at initialization and/or with each communication. In one implementation, detecting 412 is accomplished by the receiving content server receiving notice of the identity of the providing content server. A communications protocol may provide information as to the source of a communication (e.g., notice of package item) that may be used to detect whether a notice of a package item comes from a child content server.

Detecting whether a parent exists includes detecting whether the receiving content server has a parent or is a content server at the top of the parent-child hierarchy that has no parent. As discussed above, a child server may register with its parent server at initialization and/or upon establishing communication. A content server may record whether it registered as a child with another content server and/or whether other content servers registered with it as children. Detecting whether a parent exists may be accomplished by a content server checking its own records as to whether it has a parent content server. In an implementation, the receiving content server retains a record of its children and parent, so detecting 414 is accomplished by accessing the record to determine if a parent exists.

If the receiving content server does not have a parent, the process moves to detecting 420. If the receiving content server has a parent, the process moves to sending notice 416.

Sending a notice of a package item may include sending a notice of a package item to neighbor content servers. A notice may include all or part of the information provided in the notice received in receiving notice of package items 410. Sending notice 416 is accomplished by sending a notice to the parent sever of a package item received from a child server.

Marking to forward to parent includes making an indication and/or record that a package item should be receive for forwarding to a parent. Marking may be a simple as setting a bit in a register and/or modifying a header of a packet.

Detecting whether a package item is new may include comparing package items identified in a notice to package items previously considered by a receiving content server. Comparing may include comparing any aspect of a package item to determine whether the receiving content server has previously received notice of the package item or the package item itself. In one implementation, detecting 420 includes receiving a unique package item identifier from the providing content server and comparing the unique package item identifier to a list of package items previously considered by the receiving content server. Detecting 420 may further include recording the package item identifiers of all new package items to be able to identify them as not new afterwards.

Receiving a package item attribute set may include communicating a request from the receiving content server to the providing content server. A receiving content server may request that a providing content server transfer one or more package item attribute sets to the receiving content server. The request may identify package items that the receiving content server has detected are new to the receiving content server. Receiving a package item attribute set may include receiving information that includes the attribute set of a package item. Receiving a package item attribute set may include receiving an entire package item including the package item attribute set. As discussed above, a package item and/or a package item attribute set may be communicated in any conventional manner. In one implementation of receiving package item attribute set 422, the receiving content server sends a request to the providing content server that identifies the attribute sets the receiving content server would like to receive from the providing content server. A request to send an attribute set may identify the channel (e.g., frequency, encoding, unicast, multicast) that the providing content server may use to communicate the attribute set.

Upon receiving an attribute set, a receiving content server may detect (e.g., determine, compare) whether the attribute set matches (e.g., corresponds, relates) to a package item of interest to the receiving content server. Detecting an attribute match may be accomplished as discussed above. Detecting a match may include applying a rule to an attribute set of the receiving content server and the attribute set of the package item as discussed above.

In an implementation of detecting attribute match 424, the attribute set of the receiving content server ("CS") is compared to the attribute set of the package item ("PI") in accordance with the Boolean expression provided below. In the Boolean expression, the symbol "==" means equal to, the symbol "!=" means does not equal, and the symbol "<" means less than. The result (e.g., output) of the Boolean expression, Match, is true (e.g., 1) upon detecting a match and is false (e.g., 0) upon detecting that no match exists.

Match=(CS airline==PI airline) and
    (CS aircraft model==PI aircraft model) and
    (CS flight no.==PI flight no.) and
    [(CS unfinished package ID==PI ID) and
    (CS missing chunk no.==PI chunk no.)] and
    (today's date<PI delivery deadline)

In the case of the above formula, the output Match becomes true when all Boolean expressions are true. A Boolean expression, for example, CS airline==PI airline, is true when the value of the attribute for the content server and the value of the attribute for the package item produce a true result in accordance with the Boolean expression. For example, when the value of the attribute CS airline is the same as the value of the attribute PI airline, the Boolean expression CS airline==PI airline is true. When the value of the attribute "today's date" is less than the value of the attribute PI delivery deadline, the Boolean expression today's date<PI delivery deadline is true.

Sending a notice of a package item 426 may be accomplished in the same manner as sending notice 416 discussed above except that the notice is sent to content servers that are children of the receiving content server as opposed to the parent.

Receiving a package item may include a receiving content server receiving data using any conventional communication protocol via any conventional medium. Receiving a package item may include a receiving content server providing a request to a providing content server to send one or more package items to the receiving content server. A request may identify a channel that the providing content server may use to provide (e.g., transfer, communicate, transmit) the requested package items. In the event that the entire package item was sent with the attribute set, the receiving content server need not provide a notice of the package items for which a match was found because the receiving content server has already received the package items and may merely discard the package items for which there was no match. In one implementation, receiving a package item 416 includes providing a notice to the providing content server to send one or more package items.

Detecting whether a mark has been recorded to forward a package item to a parent includes detecting and/or interpreting the record created by marking 418. When a parent does not exist, process 418 is not executed, so a record is not created to mark that a package item should be forwarded to a parent. The absence of a record indicates that a package item should not be received for forwarding to a parent. If a parent exists, a record is created, so existence of a record indicates that a package item should be received for forwarding to the parent. In an implementation, marking 418 is accomplished by setting a bit in a register and/or setting a variable to a value. Detecting 430 is accomplished by detecting the set bit in the register and/or detecting a value of a register.

If detecting 430 detects the mark, process 428 is executed to receive the package item. If a mark is detected, a notice has already been sent to the parent by sending 416, so the receiving content server receives the package item to have possession of it when the parent responds to receiving the notice from process 416.

Another method for distributing content in a network may include method 500. Method 500 may include requesting notice of package items 510, detecting whether package item from child 512, detecting whether parent exists 514, marking to receive for parent 516, detecting whether package item new 518, receiving package item attribute set 520, detecting attribute match 522, receiving package item 524, and detecting whether marked to receive for parent 526.

Processes detecting whether package item from child 512, detecting whether parent exists 514, marking to receive for parent 516, detecting whether package item new 518, receiving package item attribute set 520, detecting attribute match 522, receiving package item 524, and detecting whether marked to receive for parent 528 may perform the functions and accomplish the results of detecting whether package item from child 412, detecting whether parent exists 414, marking to forward to parent 418, detecting whether package item new 420, receiving package item attribute set 422, detecting attribute match 424, receiving package item 428, and detecting whether marked for forwarding to parent 430 respectively as discussed above. Process 500 may be performed by a receiving content server.

A receiving content server may send a request to a neighbor content server to request that the neighbor content server provide a notice of the package items in possession of the neighbor content server. A notice of package items sent responsive to a request may be the same or similar to the notice provided by process 410. Requesting a notice may include receiving a notice responsive to the request. In an implementation, requesting 510 communicates a request to at least one neighbor content server for the neighbor content server to provide a notice of all of the package items stored by the neighbor content server. A notice may include an attribute set for each package item and/or an entire package item. A neighbor content server may include a parent and/or a child.

A request may identify a time of a previous request to enable the neighbor (e.g., providing) content server to provide information about package items received after any previous request. A request may include an attribute set and rule from the receiving content server so that the providing content server may provide a notice that identifies package items that may be of interest to the receiving content server.

A content server may retain a package item until it has responded to a request from each neighbor content server.

A comparison of method 400 and method 500 shows that a receiving content server performing method 400 respond to notices sent to it from other content servers. Neighbor content servers push (e.g., provide) notices, without prior solicitation, to a receiving content server regarding the package items held by the providing content server. Receiving content servers performing method 500 request information from neighboring content servers about package items held by neighbor content servers. A receiving content server that performs method 500 pulls (e.g., requests) information from neighboring content servers and acts on the information received responsive to its request.

A method of distributing information in a network may use method 400, method 500, or a combination of methods 400 and 500 to push and pull information about content throughout the network. The process of distributing package items throughout a network may be referred to as content inventory exchange.

In an implementation, content is routed through a network of fixed content servers. Each fixed content server retains content of interest to the nomadic content servers that that the fixed content server will at some time service. The attribute set of a fixed content server that services nomadic content servers is configured to receive the content for the nomadic content servers that will connect with the fixed content server. Knowledge of which nomadic content servers will at some time connect with a fixed content server may be provided by a schedule of the route of the nomadic content servers. A fixed content server may service nomadic content servers having common attributes and/or attribute values, so the attribute set of the fixed content server may be configured to receive content for the common attributes and/or attribute values.

A fixed content server may retain package items until the content expiration date is reached. After the content expiration date is past, the fixed server no longer stores the expired package items.

Upon arrival of a nomadic content server, the fixed content server, in the role of a providing content server, provides a notice to the nomadic content server of the content held by the fixed content server. The nomadic content server, in the role of a receiving content server, performs method 400 to determine whether the nomadic content server wishes to receive content from the fixed content server. In another implementation, the nomadic content server, in the role of receiving content server, performs method 500 and requests content from the fixed content server, which performs the role of the providing content server.

After the nomadic content server receives as much content as it can from the fixed content server during the duration of the connection between the fixed and nomadic content servers, the nomadic contents server leaves the communication range of the fixed content server and moves to repeat the process with a different fixed content server located at a different geographic location. A nomadic content server may also provide content to the fixed content server during the duration of a connection. For example, maintenance information as discussed above may be transferred from the nomadic content server to the fixed content server.

Distribution of content is not limited to transfers between fixed content servers or fixed content servers and nomadic content servers. A nomadic content server may establish a connection with another nomadic content server for transfer of package items in accordance with attributes. A nomadic content server may establish a connection with a fixed content server and another nomadic content server at the same time. A nomadic content server may receive content from a fixed content server and provide the content received to another nomadic content server. Nomadic content servers may communicate with each other when one or more of the nomadic content servers are outside the range of communication of a fixed content server (e.g., at airport, but out of range, in-flight).

Nomadic content servers may communicate content between each other using method 400 and/or method 500 as discussed above.

Content may be provided (e.g., inserted, injected) to a network for distribution in accordance with attributes of the content. Insertion of content into a network is discussed above with respect to insertion device 270, 272, and 370. Content may be inserted into a network to any content server, whether fixed or nomadic, in the hierarchy of the network. A device (e.g., server, computer) that provides content to a network does not need to be a content server in the network. A device that inserts content may be external to the network. A device may provide content to a content server of the network.

A connection, whether wired or wireless, between a device that provides content and a content server of the network may be referred to as an insertion point. An insertion point may define an interface between a system that is external to the network and a system that is internal to a network. An insertion point may be established using any conventional communication and/or file transfer protocol. An insertion point may be established over any conventional medium including wired and/or wireless networks.

A device that provides content to a network and/or a content server of a network may be referred to as an external content server.

Attributes may be assigned to content by a system that is wholly external to the network, wholly internal to the network, or that is distributed between an external device and an internal device. Systems 600, 700, and 800 respectively show systems that are wholly external, wholly internal, and both internal and external for assigning attributes to content and forming package items.

System 600 includes insertion device 610 and content server 690. Insertion device 610 includes content generator 620, attribute generator 630, package item generator 640, package item queue 650, and content server emulator 660. Insertion device 610 communicates with content server 690 via connection 670, so connection 670 represents the insertion point. Because content server 690 is part of the network, line 680 represents the line between the external system (610) and internal system (690).

A content generator provides content. Content may include video, music, data, and/or interactive content. Content may be saved in any conventional electronic file format. A content generator may include any conventional system that generates electronic content.

In an implementation, content generator generates video and audio content for use in-flight use on airplanes. Content provided by a content generator may include descriptors of the type of content for use by an attribute generator in generating a set of attributes or values for an attribute.

For example, content generator 620 may include a description as to whether the content is video, music, or data. Video may be further classified as feature length film, short film, commercials, news, sports, infomercial, television programming, weather, foreign programming, or any other classifier that describes the video. Music may be classified as to type, such as, classical, modern, country, jazz, contemporary, new age, or any other type of classifier that describes the music. Data may be classified as interactive shopping, computer game, news, books, magazines, short stories, interest stories, still images, or any other type of classifier that describes data. A content generator may further provide information about the content, such as presentation duration, file format, file size, creation date, content creator, and/or content requester.

An attribute generator provides an attribute set for content. A set of attributes generated by an attribute generator may include the attributes for a package item as discussed above. An attribute generator may cooperate with a content generator to provide an attribute set for content provided by the content generator. An attribute generator may receive information from any source to generate a suitable set of attributes and/or attribute values for content. An attribute generator may receive information from a manager of a network and/or a scheduler of vehicles (e.g., nomadic content servers) to aid in generating a set of attributes. Generation of an attribute set may include information provided by or selected by a human operator of an insertion device.

An attribute set may include a description of the content. For example, a value of the attribute package item description as discussed in Table 3 may be set to indicate whether the content is video, music, data, or any other conventional type of data. The value of the attribute genre as discussed in Table 3 may be set to classify the type of video, music, or data as discussed above.

In an implementation related to airlines, an external content provider receives requests from airlines for content. A request from an airline may be used to generate the content and the attributes of the content. For example, an airline request may include the type of content, a deadline for delivering the content, and an expiration date for the content. A request may further include information related to or a value for any attribute discussed above for a package item. An external content provide may further receive flight schedules, type of content needed per flight, departure airports, departure gates, gate information, delay information contents server geographic locations, information about communication capabilities between content servers, airports, gates or other physical locations from airlines, airport authorities, and/or network managers. An attribute generator receives the information provided by the various sources and information about the content and provides a set of attributes as discussed above.

A package item generator produces package items (or packages) for distribution in a network that distributes data in accordance with attributes. A package item generator may combine content provided by a content generator with an attribute set from an attribute generator that is associated with the content. A package item generator may provide a package item for distribution. A package item includes the attributes and characteristics of a package item as discussed above. A package item generator my split content into may package items having an attribute set that permits reassembly (e.g., package item sequence number) by a receiving content server. A package item generator may provide individual package items or a package of many package items.

In an implementation, package item generator 640 receive content from content generator 620 and attribute sets from attribute generator 630 to form package items for distribution by a network that distributes content using attributes as discussed above. A package item may be an electronic file having the format and information discussed above.

A package item queue stores package items prior to insertion into the network. A package item queue may receive and/or provide package items in any order. A package item queue may reorder (e.g., sort, arrange) package items in accordance with an attribute and/or a value of an attribute. A package item queue may provide package items as reordered. In an implementation, package item queue 640 is a first-in-first-out queue.

A content server emulator emulates the functions and operations of a content server as discussed above. A content server emulator may operate in accordance with the distribution protocol (e.g., method 400, method 500) used by content servers of the network. In the case of an external device that provides content to a network, the content server emulator provides package items to, but does not receive package items from, the network and/or a content server of the network. In an implementation, content server emulator 660 functions as a providing content server for providing content to a receiving content server as discussed above. Content server emulator 660 receives package items from package item queue 650 and provides the package items to content server 690 via insertion point 670 in accordance with the content distribution protocol used in the network.

Content server emulator 660 may perform the functions of content generator 620, attribute generator 630, package item generator 640, and package item queue 650.

System 700 includes insertion device 710 and insertion server 720. Insertion device 710 includes content generator 712, directory classifiers 716, external server 714, directory indicators 718, and operator 719. Insertion server 720 includes directory 722, directory 724, directory 726, attribute set generator 728, package item generator 730, and content server emulator 770. Insertion server 720 may further include a package item queue (not shown), as discussed above, to buffer package items provided by package item generator 730 and received by content server emulator 770. Insertion device 710 communicates with insertion server 720 via connection 750, so connection 750 represents the insertion point. Because insertion server 720 is part of the network, line 760 represents the line between the external system (710) and internal system (720, 780).

Content generator 712 performs the functions discussed above with respect to a content generator. An external server may perform the functions of a content generator.

A directory classifier provides information about the type of content that each directory 722-726 may receive. For example, a directory classifier may specify that all content transferred to directory 722 be content that is for Delta Airlines for use in domestic in-flight entertainment. Another directory classifier may specify that all content transferred to directory 724 be for United Airlines for international flights. Another directory classifier may specify that all content transferred to directory 726 be flight information for the flight crew of a particular flight, a particular type of aircraft, and/or a particular airline.

A directory classifier may include information as to the insertion point that must be used to insert content into a directory. Each directory may have a unique address for accessing the directory. A directory classifier may include the information that an external server may need to access the directory. For example, information needed to access a directory may include a directory name, directory number, an IP address, a file transfer protocol ("FTP") address, a channel address, and/or any conventional information for transferring information to a specific location and/or file system.

Information in a directory classifier may be provided to an insertion device by the entity (e.g., network manager, system operator) responsible for establishing directories in an insertion server.

A directory indicator indicates the directory to which a particular content must be provided. An operator may assist in forming a directory indicator. An operator may assess the type of content, determine the directory most appropriate for the content in accordance with the directory classifiers, and provide the information for accessing the selected directory as a directory indicator. A directory indicator may provide an insertion server with instructions for accessing and transferring content to a particular directory. An operator may include a human operator and/or a machine assisted by a human operator.

A directory indicator may be stored with the content or stored separate from the content (e.g., separate queue), but associated with the content for provision to the external server. In an implementation, a human operator assesses directory classifiers 716 and provides directory indicator 718 for each file of content generated by content generator 712. Directory indicator 718 is stored as metadata to each file of content.

An external server receives content from a content generator and directory indicators. Using the directory indicator, the external server transfers the content associated with the directory indicator to the appropriate directory in the insertion server. A content server may perform any conventional communication and/or file transfer operation to transfer content to a directory. In an implementation, content server 714 does not establish or manage directories 722-726. Content server 714 receives content from content generator 712 and instructions on how to transfer the content to a directory from directory indicators 718. External server 714 transfers the content to a directory using the instructions. In an implementation, external server 714 transfers content to directories using FTP. Directory indicators 718 provide instructions for transferring content using FTP. External server 714 has write-only access to directories 722-726.

A directory is a storage area that receives, stores, and provides content. A directory is created, managed, and/or deleted by a manager of the insertion server and/or a network. A manager of the insertion server creates directories and provides directory classifiers to external providers of content for use by an insertion device. A manager may further specify the insertion point for transferring content from insertion device 710 to directories 722-726 as discussed above.

An attribute generator provides attributes for distribution of package items in a network. An attribute generator provides an attribute that corresponds to the directory classifiers used by an insertion device to transfer content to a directory. An attribute generator has knowledge of directory classifiers and/or of the directory structure so that as content is received from a directory, the attribute generator provides an appropriate attribute set for the content from the directory. An attribute set provided by an attribute generator may include any of the attributes discussed above with respect to a package item.

Package item generator 730 may inform attribute generator 728 of the directory accessed to retrieve content to form a package item. Attribute generator 728 provides an attribute set associated with the directory accessed to retrieve content. For example, each time package item generator 730 accesses directory 724 to receive content to form a package item, package item generator 730 requests attribute generator 728 to provide the attribute set associated with directory 724.

A manager of the insertion server and/or the network provides the attribute set that corresponds to each directory. Because the manager provides the directory classifiers, instructions for transferring to a directory, creates the directories, and provides the attribute set associated with each directory, the manager, for the most part, controls the process of inserting content into the network. An external content provider may improperly construe the directory classifiers and place inappropriate content into a directory; however, directory classifiers are generally so simple, as discussed above, that an external provide may construe them without error.

Package item generator 730 may perform some or all of the functions of a package item generator discussed above. Package item generator 730 may receive content from a directory, an attribute set from attribute generator 728 and provide package items for distribution in a network.

In an implementation, attribute generator 728 provides an attribute set for content stored in directory 722 that was transferred to directory 722 in accordance with the content classifier indicating that the content is for Delta Airlines for use for domestic in-flight entertainment. Each time package item generator 730 receives content from directory 722, attribute generator 728 provides an attribute set appropriate for the content. In this example, the attribute set may include a package identifier, a package item sequence number, an airline name with the value Delta, an activation date, a delivery date, an expiration date, and airport having values that correspond to the airports that originate domestic flights for Delta Airlines.

Content server emulator 770 may perform the functions of a content server emulator discussed above. The functions of content server emulator 770 may be performed by a content server of a network.

All or a portion of the functions of insertion server 720 may be perform by a content server of a network (e.g., server 780). For example, insertion server 720 may be part of a fixed content server or a nomadic content server. In an implementation, insertion server 720 is located on an airplane, so that maintenance information from the plane may be inserted into the network via the nomadic content server on the plane for distribution to the plane owner or airline operator.

System 800 includes insertion device 810 and insertion server 820. Insertion device 810 includes content generator 812, abbreviated attribute generator 814, external server 816, and operator 818. Insertion server 820 includes directory 824, directory 840, attribute select 860, content select 862, complete attribute generator 870, package item generator 880, and content server emulator 890. Insertion server 820 may further include a package item queue (not shown), as discussed above, to buffer package items provided by package item generator 880 and received by content server emulator 890. Insertion device 810 communicates with insertion server 820 via connection 850, so connection 850 represents the insertion point. Because insertion server 820 is part of the network, line 852 represents the line between the external system (810) and internal system (820, 892).

Content generator 812 performs the functions discussed above with respect to a content generator.

An abbreviated attribute generator provides a set of attributes having a value for some or all of the attributes and/or some or all of the values for the attributes. The attribute set may be a subset or the entirety of the attribute set used to distribute content in a network. An abbreviated attribute generator provides an attribute set and values for attributes in accordance with the content provided by a content generator. An operator may provide information about the content to the abbreviated attribute generator, so that the abbreviated attribute generator may generate an appropriate set of attributes. Operator 718 may include an electronic device that receives a description of the content from content generator 812, as discussed above, for use by abbreviated content generator 814 to produce a set of attributes. Operatory 718 may include a human operator that receives information regarding content from content generator 812 or another source and provides information to abbreviated attribute generator 814 for generation of an attribute set.

For example, content generator 812 may receive information, likely from a human operator, that the content being generated is for American Airlines eastbound domestic flights. Content generator 812 may include the information from the human operator into the content file as metadata. Because the information necessary to produce the abbreviated attribute has been embedded into the content file, operator 818 includes an electrode device for receiving the metadata and providing the metadata to abbreviated attribute generator 814. Abbreviated attribute generator 814 uses the metadata to produce an abbreviated set of attributes and provides the set of attributes to external server 816.

External server 816 receives content from content generator 812 and an abbreviated set of attributes from abbreviated attribute generator 814. External server 814 transfers the content and the abbreviated attribute set to insertion server 820. External server 814 transfers content and abbreviated attributes to directories in a storage system of insertion server 820. In this example, external server 816 controls the creation, deletion, and maintenance of directories in insertion server 820. External server 816 may use any criteria for creating a directory for transfer of content. For example, external server 816 may create one directory for each airline, one directory for all domestic flights regardless of airline, one directory for each airport, and/or one directory for each gate at each airport. External server 816 creates directories in accordance with its policy and transfers content and abbreviated attribute sets to the directories in accordance with the policy.

A manager of the insertion server or network may provide external server 816 with information for accessing and managing directories in insertion server 820. For example, a manager may provide a directory naming policy, a maximum amount of storage space, an IP address, an FTP address, instructions for accessing (e.g., read, write, delete) the storage space, and/or any information for transferring information to a specific location and/or file system using a conventional protocol.

Because insertion device 810 provides content with an abbreviated attribute set, insertion server 820 does not need to have knowledge of the criteria for creating each directory 822 or 840. An abbreviated attribute (e.g., 826, 832) provides enough information for insertion server 820 to complete the attribute set if necessary.

An external server may perform the functions of a content generator and an abbreviated attribute generator. An external server may perform some or all of the functions performed by an electronic operator. An external server may include a user interface (e.g., keyboard, monitor, software) for receiving information from and providing information to a human operator.

In an implementation, external server 816 users FTP to create and manage directories and to transfer data into the directories in the storage system of insertion server 820. External server 816 uses FTP operations to create directories 822 and 840. Using an FTP write command, external server 816 transfers content 828 and abbreviated attribute set 826 into directory 822 as file 824, and content 834 and abbreviated attribute set 832 into directory 822 as file 830. External server 816 may also create and transfer files to directory 840 or any other directory external server 816 creates. In this example, external server 816 creates directory 822 to hold content for Alaskan Airlines flights. File 824 may hold a movie. File 830 may hold music. Directory 840 may be created to hold content using a different criteria.

An attribute selector receives abbreviated attributes from files stored in a directory in any conventional manner. A content selector receives content from files stored in a directory in any conventional manner.

A complete attribute generator receives an abbreviated attribute set and augments the attribute set to form a complete attribute set for distributing content in a network. A complete attribute generator may add attributes and/or provide values for attributes to a set of attributes provided by abbreviated attribute generator 814. A complete attribute generator may receive information from a manager of a network for forming a complete attribute set in accordance with an abbreviated attribute set.

In the event that abbreviated attribute generator 814 provides a complete attribute set, complete attribute generator 870 may perform the function of verifying the structure and content of the attribute set and flagging any potential issues as opposed to providing additional attributes and/or values. An abbreviated attribute generator may provide a complete attribute set in the manner discussed above with respect to system 600. In a system in which abbreviated attribute generator 814 provides a complete set of attributes and no verification is needed, complete attribute generator 870 may be eliminated from insertion server 820.

Package item generator 880 may perform some or all of the functions of a package item generator discussed above. Package item generator 880 receives content from content select 862 and the complete attribute set associated with the content from complete attribute generator 870 to generate a package item.

Content emulator 890 may perform some or all of the functions of a content emulator discussed above. A content emulator receives package items from package item generator 880 for distribution in the network. Content emulator 890 may provide package items to content server 892.

As discussed above, the functions of a content emulator may be performed by a content server of the network. As further discussed above, the functions of an insertion server may be performed by a content server. The memory of a content server may be used as a storage area for establishing directories. A content server may cooperate with an external server to create and manage directories as instructed by the content server. A content server may perform the functions of attribute select 860, content select 862, complete attribute generator 870, and package item generator 880.

Content may be received (e.g., extracted, removed) from a network in accordance with attributes of the content. Extraction of content is discussed above with respect to extraction device 278 and 390. Content may be extracted from a network from any content server in the hierarchy of the network. A device (e.g., server, computer) that extracts content from a network does not need to be a content server in the network. A device that extracts content may be external to the network. A device may cooperate with a content server of the network to extract content from the network in accordance with a set of attributes.

A connection, whether wired or wireless, between a device that extracts content and a content server of the network may be referred to as an extraction point. An extract point may define an interface between a system that is external to the network and a system that is internal to a network. An extraction point may be established using any conventional communication and/or file transfer protocol. An extract point may be established over any conventional medium including wired and/or wireless networks.

System 900 extracts content from a network that distributes content in accordance with attributes. System 900 includes extraction server 910 and extraction device 950. Extraction server 910 includes content server 920 and transfer device 940. Content server 920 includes attributes 922. Transfer device 930 includes directory generator 932, directory queue 934, content queue 936, and transfer server 938. Extraction device 950 includes directory 952, directory 954, directory 956, and external server 958. Extraction server 910 communicates with extraction device 750 via connection 940, so connection 940 represents the extraction point. Because extraction server 910 is part of the network, line 942 represents the line between the internal system (910) and the external system (950).

An extraction server receives content from a network that distributes content in accordance with attributes. An extraction server provides content to an extraction device. An extraction server may communicate with an extraction device using any conventional communication and/or file transfer protocol. An extraction server may transfer content to an extraction device using any conventional medium (e.g., wired, wireless, network, direct connection).

An extraction device is a device (e.g., computer, server) that is external to the network. A manager of an extraction device may provide a manager of the network with a description of the data the extraction device would like to receive. A network manager may use the description to form an attribute set of a content server for receiving the desired content. Upon receipt of content, the extraction server may transfer the information to the extraction device. An extraction device may use content extracted from the network for any purpose.

An extraction server may transfer content to an extraction device via an extraction point. An extraction point includes any conventional connection for transferring information.

In an implementation, content server 920 performs the functions of a content server of a network that distributes content in accordance with attributes. Content server 920 may be a fixed content server or a nomadic content server. Content server 920 may perform the functions of a parent and/or a child content server. A fixed content server that performs the functions of an extraction server may extract content from a network for provision to a geographically fixed location. For example, a fixed content server may extract airplane maintenance information inserted into the network by airplanes at any location in the network. The maintenance information would be distributed via the network to the fixed content server that extracts the maintenance content for provision to the offices of the airline or airplane owner.

A nomadic content server that performs the functions of an extraction point may extract content from a network for use by the nomadic vehicle or the personnel of the nomadic vehicle. For example, a nomadic content server on an aircraft may receive content for the in-flight entertainment system of the aircraft. Upon receipt of the content, the nomadic server on the aircraft may transfer the entertainment content to the in-flight entertainment system for use by passengers in the plane.

Content server 920 includes at least one set of attributes for receiving the content desired by the extraction device. A manager of extraction device 950 provides a manager of content server 920 or the network with a description of the characteristics of the information to be transferred to extraction device 950. The manager of content server 920 generates (e.g., develops, creates, configures) one or more sets of attributes 922 for use by contents server 920. Using attributes 920, content server 920 receives the information that extraction device 950 desires to receive.

For example, an airline (e.g., Southwest) may desire to receive information from each crew of its aircraft for each flight. Such information may include the name of the crew on the flight, the functions perform by each crew member, and reportable incidents (e.g., passenger illness, passenger unruliness, food shortages, food surpluses, directives from the captain, crew illness, technical difficulties with equipment) detected by crew members. A manager of content server 920 would develop an attribute set, as described above, that would permit content server 920 to receive all crew information for all Southwest flights. A set of attributes may be developed so that content server 920 receives content having other attributes (e.g., maintenance data, aircraft system data, fuel consumption data, take-off times, touch-down times, weight).

An extraction device may set aside storage for receipt of content from an extraction server. An extraction device may provide instructions for transferring content to the storage area of the extraction device. An extraction device may provide information (e.g., IP address, FTP address, conventional transfer protocol information) for establishing a extraction point.

In an implementation, extraction device 950 and/or a manager of extraction device 950 creates directories 952, 954, and 956 for receiving content from extraction server 910. Extraction device 950 specifies the attributes of the content for each directory. Extraction device 950, or a manager of extraction device 950, provides the directory information to a manager of extraction server 910. The manager of extraction server 910 associates the attributes specified for receiving content at content server 910 with the directories created by content server 950. The association information is incorporated into directory generator 932.

A directory generator translates a set of attributes used to receive content into information for transferring the content into a directory of extraction device 950. The information used for transferring content may include a directory name, a directory location, an IP address, an FTP address, or any information for transferring data using a conventional communication and/or file transfer protocol. A transfer server uses the information provided by directory generator 932 to transfer content to an appropriate directory in extraction device 950.

Content queue 936 performs the functions of a content queue discussed above. Directory queue 934 queues directory information provided by directory generator 934. Content queue 936 and directory queue 934 cooperate to provide the directory information that is associated with the proper content.

A transfer server receives content and directory information. A transfer server transfers the content to the directory indicated by the directory information. A transfer server may use any conventional communication and/or file transfer protocol to transfer information to a directory of extraction device 950. In an implementation, transfer system 938 receives content from content queue 936 and directory information from directory queue 934. Transfer server 938 uses the directory information to transfer the associated content to a directory (e.g., 952, 954, 956) of extraction device 950. The directory information from directory queue 934 enables transfer server 938 to transfer content to a directory established to receive content having the attributes of the content transferred.

For example, extraction device 950 may be operated by United airlines. United airlines may wish to receive maintenance information from each aircraft after each leg of a flight, crew information, usage of in-flight paid services, time of arrival information, departure time information, and food and beverage consumption information. A manager of the United extraction device provides a description of the content that United wishes to receive, a description of the directories established to receive the content, and instructions on how to access the directories. The manager of content server 920 develops one or more sets of attributes so that content server 920 will receive the content desired by United. The manager of the systems on each United aircraft configures the systems of the aircraft to provide the desired content to an insertion device on the aircraft. The insertion device will provide a set of attributes for the desired content so that the content may be distributed through the network in accordance with the attributes and received by content server 920. The manger of the nomadic content server on each United aircraft configures the nomadic content server on each aircraft to receive the content inserted into the network by the aircraft insertion device.

As an aircraft operates, the systems on the aircraft provide information to the insertion device on the aircraft. The insertion device cooperates with the nomadic content server, which performs the functions of an insertion server discussed above, to provide a set of attributes for the content. The nomadic content server receives the content from the insertion device and forms package items. Upon touch-down at an airport, the nomadic contents server transfers the package items to a fixed content server at the airport where the aircraft is presently located. The package items are distributed through the network in accordance with the attributes of each package item. Content server 920 receives the package items in accordance with the one or more sets of attributes of content server 920. Content server 920 transfers the content to an appropriate directory in extraction device 950 as discussed above.

External server 958 may access the directories 952-956 to retrieve the content. External server 958 may transfer content to any person and/or system using any conventional protocol. External server 958 may provide information (e.g., amount transferred, amount retrieved, errors, storage available, transfer rates, statistics therefor) regarding the content transferred to directories of extraction device 950. External server 958 may further be used to manage the directories of extraction device 950.

A content server may perform all of part of the functions of a transfer device.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below.

What is claimed is:

1. A system for providing one or more package items to a provided nomadic server, the nomadic server positioned on a provided vehicle, the nomadic server moves with the vehicle, the system comprising:
 a fixed server positioned at a location, wherein while the vehicle is positioned at the location, the fixed server:
  applies a rule to detect whether a match exists between a first attribute of the one or more package items and a second attribute, the vehicle comprises the second attribute, each package item comprises a content, a respective unique identifier, and the first attribute;
  transmits a first notice, the first notice comprises the unique identifier of each package item for which the match exists; and
  receives a second notice, the second notice comprises one or more of the unique identifiers of the first notice, each unique identifier of the second notice corresponds to a respective package item not stored by the nomadic server on the vehicle.

2. The system of claim 1 wherein the fixed server further transmits the content of one or more package items of the second notice.

3. The system of claim 1 wherein the first notice does not include the content of any package item.

4. The system of claim 1 wherein the fixed server evaluates a Boolean expression to apply the rule.

5. The system of claim 1 wherein the fixed server:
 evaluates a Boolean expression to apply the rule; and
 the rule indicates a match when a result of the evaluation is true.

6. The system of claim 1 wherein at least one of the first attribute and the second attribute comprises at least one of a flight number, a gate number, an airline identifier, a truck number, and a job number.

7. The system of claim 1 wherein the fixed server further receives the second attribute when the nomadic server establishes communication with the fixed server.

8. A method performed by a fixed server for providing one or more package items to a nomadic server, each package item comprising a content, a respective unique identifier, and a first attribute, the fixed server positioned at a location, the method comprising:
 applying a rule to detect whether a match exists between the first attribute of the one or more package items and a second attribute, the vehicle comprising the second attribute, the vehicle positioned at the location, the nomadic server positioned on the vehicle, the nomadic server moves with the vehicle;
 transmitting a first notice, the first notice comprising the unique identifier of each package item for which the match exists; and
 receiving a second notice, the second notice comprising one or more of the unique identifiers of the first notice, each unique identifier of the second notice corresponding to a respective package item not stored by the nomadic server on the vehicle.

9. The method of claim 8 further comprising transmitting the content of one or more package items of the second notice.

10. The method of claim 8 wherein the first notice does not include the content of any package item.

11. The method of claim 8 further comprising receiving the second attribute when the nomadic server establishes communication with the fixed server.

12. The method of claim 8 wherein applying the rule comprises evaluating a Boolean expression.

13. The method of claim 8 wherein:
 applying the rule comprises evaluating a Boolean expression; and
 the rule indicates the match when a result of the evaluation is true.

14. The method of claim 8 wherein at least one of the first attribute and the second attribute comprises at least one of a flight number, a gate number, an airline identifier, a truck number, and a job number.

15. A method performed by a providing server for providing one or more package items to a receiving server, each package item comprising a content, a respective unique identifier, and a first attribute, the method comprising:
 applying a rule to detect whether a match exists between the first attribute of the one or more package items and a second attribute, the receiving server comprising the second attribute, the one or more package items stored by the providing server;

transmitting a first notice, the first notice comprising the unique identifier of each package item for which the match exists; and receiving a second notice, the second notice comprising one or more of the unique identifiers of the first notice, each unique identifier of the second notice corresponding to a respective package item not stored by the receiving server.

16. The method of claim 15 further comprising transmitting the content of one or more package items of the second notice.

17. The method of claim 15 wherein the first notice does not include the content of any package item.

18. The system of claim 15 wherein at least one of the first attribute and the second attribute comprises at least one of a flight number, a gate number, an airline identifier, a truck number, and a job number.

19. The method of claim 15 further comprising receiving the second attribute from the receiving server.

* * * * *